(12) United States Patent
Quinn et al.

(10) Patent No.: US 10,609,042 B2
(45) Date of Patent: Mar. 31, 2020

(54) DIGITAL DATA ASSET PROTECTION POLICY USING DYNAMIC NETWORK ATTRIBUTES

(71) Applicant: Cisco Technology, Inc., San Jose, CA (US)

(72) Inventors: Paul Quinn, Wellesley, MA (US); Michael E. Lipman, Harvard, MA (US); Mike Milano, Groton, MA (US); David D. Ward, Los Gatos, CA (US); James Guichard, New Boston, NH (US); Leonid Sandler, Jerusalem (IL); Moshe Kravchik, Beit Shemesh (IL); Alena Lifar, San Jose, CA (US); Darrin Miller, Marysville, OH (US)

(73) Assignee: Cisco Technology, Inc., San Jose, CA (US)

( * ) Notice: Subject to any disclaimer, the term of this patent is extended or adjusted under 35 U.S.C. 154(b) by 103 days.

(21) Appl. No.: 15/387,123

(22) Filed: Dec. 21, 2016

(65) Prior Publication Data
US 2017/0237747 A1    Aug. 17, 2017

Related U.S. Application Data

(60) Provisional application No. 62/295,492, filed on Feb. 15, 2016, provisional application No. 62/295,485, (Continued)

(51) Int. Cl.
*H04L 29/06* (2006.01)
*G06F 21/60* (2013.01)
(Continued)

(52) U.S. Cl.
CPC .......... *H04L 63/107* (2013.01); *G06F 21/602* (2013.01); *G06F 21/6218* (2013.01);
(Continued)

(58) Field of Classification Search
CPC ... H04L 63/107; H04L 63/20; H04L 63/0428; G06F 21/602; G06F 21/6218; H04W 12/08
See application file for complete search history.

(56) References Cited

U.S. PATENT DOCUMENTS 9,082,091 B2 *  7/2015  Doraiswamy ......... G06F 21/604
9,426,120 B1 *  8/2016  Kim ..................... H04L 63/102
(Continued)

FOREIGN PATENT DOCUMENTS

EP    2 950 231 A1    12/2015    ............. G06F 21/62

*Primary Examiner* — Michael Pyzocha
(74) *Attorney, Agent, or Firm* — Campbell Stephenson LLP

(57) ABSTRACT

Various systems and methods for determining whether to allow or continue to allow access to a protected data asset are disclosed herein. For example, one method involves receiving a request to access a protected data asset, wherein the request is received from a first user device; determining whether to grant access to the protected data asset, wherein the determining comprises evaluating one or more criteria associated with the first user device, and the criteria comprises first information associated with a first policy constraint; and in response to a determination that access to the protected data asset is to be granted, granting access to the protected data asset.

20 Claims, 11 Drawing Sheets

Related U.S. Application Data filed on Feb. 15, 2016, provisional application No. 62/295,487, filed on Feb. 15, 2016, provisional application No. 62/295,495, filed on Feb. 16, 2016.

(51) Int. Cl.
*H04W 12/08* (2009.01)
*G06F 21/62* (2013.01)
*H04W 12/00* (2009.01)

(52) U.S. Cl.
CPC ........ *H04L 63/0428* (2013.01); *H04L 63/108* (2013.01); *H04L 63/20* (2013.01); *H04W 12/00503* (2019.01); *H04W 12/08* (2013.01)

(56) References Cited

U.S. PATENT DOCUMENTS

| | | | | |
|---|---|---|---|---|
| 9,426,182 B1* | 8/2016 | Zeljko | ................... | H04L 63/20 |
| 10,348,561 B1* | 7/2019 | Caine | ................... | H04L 67/18 |
| 2002/0051540 A1 | 5/2002 | Glick et al. | ................... | 380/258 |
| 2005/0262132 A1* | 11/2005 | Morita | ................ | G06F 21/6218 |
| 2006/0120526 A1* | 6/2006 | Boucher et al. | .... | G06F 21/6218 |
| | | | | 380/247 |
| 2007/0027972 A1* | 2/2007 | Agrawal | ............ | G06F 9/44505 |
| | | | | 709/223 |
| 2007/0101438 A1 | 5/2007 | Govindarajan | ................ | 726/27 |
| 2007/0115940 A1* | 5/2007 | Kamen | .............. | H04L 63/0853 |
| | | | | 370/352 |
| 2007/0156659 A1* | 7/2007 | Lim | ................... | G06F 21/6227 |
| 2009/0178129 A1* | 7/2009 | Cross et al. | ......... | H04L 9/3213 |
| | | | | 726/10 |
| 2009/0247125 A1* | 10/2009 | Grant | ................. | H04M 1/7253 |
| | | | | 455/411 |
| 2009/0300712 A1* | 12/2009 | Kaufmann et al. | ..... | G06F 21/10 |
| | | | | 726/1 |
| 2010/0056183 A1* | 3/2010 | Oh | .................... | H04L 12/1818 |
| | | | | 455/456.3 |
| 2010/0146269 A1* | 6/2010 | Baskaran | ................ | G06F 21/10 |
| | | | | 713/165 |
| 2012/0284325 A1* | 11/2012 | Erb | ....................... | H04L 63/107 |
| | | | | 709/203 |
| 2012/0297461 A1* | 11/2012 | Pineau | ............... | G07C 9/00103 |
| | | | | 726/4 |
| 2013/0029641 A1* | 1/2013 | Hickie | ................. | G06F 21/604 |
| | | | | 455/411 |
| 2013/0291055 A1* | 10/2013 | Muppidi, Sr. et al. | ...................... | |
| | | | | H04W 12/08 |
| | | | | 726/1 |
| 2013/0311737 A1 | 11/2013 | Shaw et al. | ................... | 711/163 |
| 2013/0324081 A1* | 12/2013 | Gargi | ..................... | H04M 1/67 |
| | | | | 455/411 |
| 2014/0053280 A1* | 2/2014 | Durazzo et al. | .... | H04L 63/0281 |
| | | | | 726/28 |
| 2014/0075493 A1 | 3/2014 | Krishnan | ......................... | 726/1 |
| 2015/0200921 A1* | 7/2015 | Linga et al. | ............ | G06F 21/44 |
| | | | | 713/171 |
| 2015/0244822 A1* | 8/2015 | Martini | ................... | H04L 41/50 |
| | | | | 709/225 |
| 2015/0295901 A1* | 10/2015 | Woodward | ........... | H04W 12/06 |
| | | | | 713/168 |
| 2015/0365787 A1* | 12/2015 | Farrell | ................... | H04W 4/029 |
| | | | | 455/456.1 |
| 2015/0382195 A1* | 12/2015 | Grim | ....................... | H04L 63/08 |
| | | | | 726/4 |
| 2016/0180107 A1* | 6/2016 | Panchbudhe | ....... | G06F 21/6218 |
| | | | | 726/28 |
| 2016/0255068 A1* | 9/2016 | Pritchard | ................ | G06F 21/35 |
| | | | | 726/7 |
| 2016/0275285 A1* | 9/2016 | Childress | ................ | G06F 21/44 |
| 2016/0300070 A1* | 10/2016 | Durham | ............. | G06F 21/6209 |
| 2017/0054756 A1* | 2/2017 | Jones et al. | ............. | H04L 63/20 |
| 2017/0124342 A1* | 5/2017 | Panchapakesan et al. | .................. | |
| | | | | G06F 21/6209 |
| 2017/0180388 A1* | 6/2017 | Belz | ..................... | H04L 63/105 |

* cited by examiner

DIGITAL DATA ASSET PROTECTION POLICY USING DYNAMIC NETWORK ATTRIBUTES

RELATED APPLICATIONS

This application claims the domestic benefit under Title 35 of the United States Code § 119(e) of U.S. Provisional Patent Application Ser. No. 62/295,492, entitled "Dynamic Location Tracking for Digital Asset Policy," filed Feb. 15, 2016; and U.S. Provisional Patent Application Ser. No. 62/295,485, entitled "Data Analytics as a Policy Information Point," filed Feb. 15, 2016; and U.S. Provisional Patent Application Ser. No. 62/295,487, entitled "Method to Enable Rich Policy Enforcement on Stateless Clients," filed Feb. 15, 2016; and U.S. Provisional Patent Application Ser. No. 62,295,495, entitled "Digital Asset Protection Policy Using Dynamic Network Attributes," filed Feb. 16, 2016. Each of the aforementioned provisional patent applications are hereby incorporated by reference herein, in their entirety and for all purposes, as if completely and fully set forth herein.

BACKGROUND

Given the number of recent high-profile security breaches, protection of enterprise digital data asset has become increasingly important. Digital data assets (or "data assets," for short) include, as some non-limiting examples, data such as documents, spreadsheets, digital images, source code, and other forms of digital data. Current authentication and data protection schemes focus on protecting access to the asset itself, often through network application user authentication. For instance, in many current environments, access to digital data assets is granted following a simple authentication via a username and password. However, the data asset can reside in a filesystem or a database where, once accessed the first time, the data asset can be manipulated, moved, stored, shared, or otherwise flow in an uncontrolled and unencrypted manner throughout an enterprise network, and in many cases, beyond the original enterprise network. Thus, as demonstrated in part by various security breaches, the current authentication and data protection schemes are often insufficient to adequately protect such digital data assets.

BRIEF DESCRIPTION OF THE DRAWINGS

The present disclosure may be better understood in its numerous objects, features, and advantages made apparent to those skilled in the art by referencing the accompanying drawings.

DETAILED DESCRIPTION

Overview

Figure 1A:
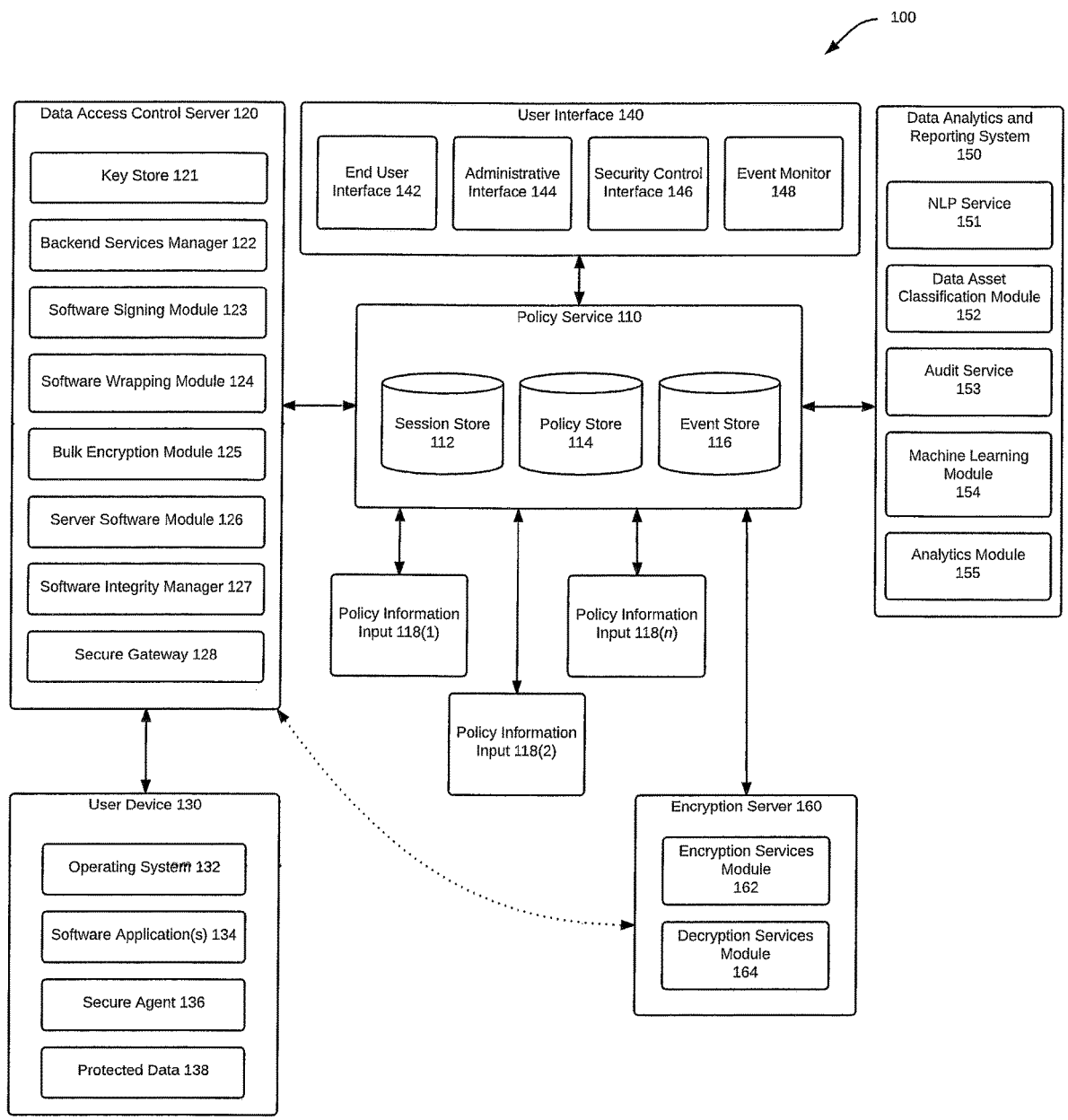
FIG. 1A is a block diagram of a system, including a policy store, a data access control server, a user device (e.g., a client computing device, which includes a secure agent, in addition to hardware and other software), a user interface, data analytics and reporting services, and other features, according to one embodiment.

This disclosure provides examples of methods and systems for data protection that employ dynamic network and other information to control access to digital data assets (including physical assets, such as, e.g., physical devices; and data assets, such as, e.g., computer files and other forms of data, such as are discussed in more detail herein). Methods and systems such as those described herein leverage information sources, such as, e.g., network and security information, and couple that information with rich policy information to control access to such digital data assets (e.g., by controlling which data assets can be decrypted, by whom, and subject to what constraints).

For example, by using methods and systems such as those described herein, an administrator or other entity can express and enforce a policy that takes into account location information at one or more levels of granularity, to limit access to a data asset such as a document. As one example, a doctor may only have access to view a patient record when he or she is in a patient room. However, when the doctor moves to a less secure location (such as, e.g., a cafeteria), he or she should not have access to view the document in that location. As another example, a laptop or tablet computer may only have access to a document when an associated cellular device (e.g., a cell phone) is within a predetermined distance (e.g., 10 feet), which can prevent continued access to the document if the cellular device (presumably being held by the user) is separated from the laptop or table computer being used to access the document. In one embodiment, this predetermined distance can be determined, for example, by considering geographic distance between the devices, based on the availability of a wireless connection between the devices, by requiring the two devices to be on the same wireless access point (WAP), or by some other mechanism.

The ability to access the document is controlled, in part, by decrypting the document (that was previously encrypted) when access is granted, and then returning the document to its encrypted format when access is removed. More specifically, methods and systems for data protection such as those described herein provide for the use of physical and/or virtual location, as well as location information gleaned from network information, identity, and other associated information, in order to locate a user, a device, the data asset, and/or some combination thereof, in order to sufficiently inform the enforcement of one or more policies by a policy server.

At its most basic and fundamental level, methods and systems such as those described herein add a new dimension to data protection by securing data assets through encryption and decryption. However, a platform implementing the methods and systems disclosed herein provides much more functionality than simple encryption and decryption. For instance, such methods and systems protect moveable data assets by controlling access to those data assets by using one or more of the techniques described herein. Therefore, in the event that a device is compromised or a data asset is mistakenly sent to an unintended recipient, such methods and systems prevent, at a minimum, the data of the data asset from being decrypted (and therefore prevents the underlying data asset from being accessed in any meaningful way) without the policy attributes first being enforced, as will be discussed in more detail below. Moreover, such controls can be implemented in a way that provides additional security, for example, via communications with one or more security monitoring and control modules and/or by alerting one or more security management entities (e.g., a system administrator, a security manager, and/or other such party) about the occurrence of an unapproved access request or other potentially-troublesome events.

In certain embodiments, such methods and systems provide for the use of a policy engine that allows a person or entity (such as, e.g., an administrator) to control access to digital data assets, and to encrypt those data assets. Among other functionality, the policy engine decides if a user and/or user device has the ability to access the data, which can be referred to as a "single policy decision point." The attributes of the policy engine will allow the administrator to use various inputs from various systems. Examples of such inputs include, but are not limited to, information generated by an identity services engine (ISE) and/or a mobility services engine (MSE), as well as various add-on capabilities and services, such as posture assessment, which might be provided, e.g., by way of an inline posture node (IPN). Certain embodiments also include the ability to analyze various underlying events and event logs to build a full telemetry and analytics engine that learns from the platform to dynamically adjust policy.

In combination with other aspects of methods and systems such as those disclosed herein, network user/device authentication provides access to, for example, network resources, and in some cases provides a strong assertion of identity. However, such network user/device authentication has no impact on accessing data, such as, e.g., on a file store, a record in a database, or part of some enterprises custom application, among other examples. In many cases, network authentication systems track user type, user location, type of device, and so on, which previously were not used for policy decisions above the network layer. The functionality provided by methods and systems such as those disclosed herein, however, enables the usage of information such as this to control access to digital data assets.

The disclosure provided herein describes examples of a rights-based data access platform that protects data assets wherever such data assets may be located, moved to, accessed from, and/or the like, eliminating data breach and data loss vectors, among other such untoward events. Among other functionality, methods and systems such as those disclosed herein provide contextual correlation of user, location, time, and threat vectors across data, application and network layers. In one aspect, such methods and systems allow digital data assets to be protected based on factors pertaining to the identity of the party accessing the data asset, which data asset is being accessed, what is being done to or by that data asset (e.g., read-only versus write access to the data asset), when and the location from where that data asset is being accessed, and the amount of time that has elapsed since the policy was last updated or access was last verified. Additionally, such methods and systems allow for the application of advanced cryptographic algorithms based on threat parameters. Moreover, fine-grained policies can be used to align protection to business and intellectual property (IP) contexts. Furthermore, such methods and systems provide techniques that can be used to secure a digital data asset throughout the data asset's lifecycle.

Methods and systems according to the present disclosure are able to provide today's enterprise systems a flexible platform to securely collaborate and transmit data assets within and across organizations whether on premise or in the cloud. By doing so, such methods and systems accelerate secure business productivity and prevent data breach, data loss and data misuse vectors. Such methods and systems work seamlessly across operating systems and applications, supporting easy integration of legacy infrastructure as well as policy workflows. Such methods and systems provide security for digital data assets (such as are discussed in more detail elsewhere herein) in various situations, such as when those digital data assets are accessed and transmitted from one user to another, between storage systems and users, and/or are otherwise conveyed or communicated. This disclosure describes a rich set of contextual policy attributes, such as, for example, information regarding user, group, and location at the network, application and data layer coupled with various encryption techniques, thereby significantly improving data access security. This disclosure also describes methods and systems that help to ensure data privacy by ensuring that data assets are free from unauthorized intrusion. Moreover, such methods and systems can provide for a policy that enforces constraints on which user(s) have the right to access a given data asset. As a result, the data asset is private between the parties that share the data asset as between them, based on the applicable policy or policies. In one embodiment, digital data assets are managed by content managers, such as, e.g., a cloud-based repository hosting service (e.g., GITHUB) or other source control platforms. In one embodiment, application-level controls can be used to prevent users from copying-and-pasting (or performing similar functionality, such as cut-and-pasting) information from the secure document (following decryption) into an unsecured document. Similarly, application-level controls can be used to prevent users from saving the document as an unsecured or unencrypted document, or to enable or permit users to only save encrypted documents.

The disclosure provided herein describes various components that can be configured to work together to collectively protect (what is referred to herein as) digital data assets by facilitating control over access thereto. Digital data assets (or more simply "assets") can include, e.g., documents, spreadsheets, source code, other files (e.g., video files, image files, and audio files), or any other data in use, storage or transit. Digital data assets can be protected by defining one or more policies that govern access to such digital data assets and/or groups of digital data assets to which such digital data assets may belong (allowing for membership in more than one such group (and referred to herein as a data asset group), as will be appreciated in light of the present disclosure).

Policies such as those discussed herein can be defined by using various attributes, such as, e.g., the principal or user attempting to access a protected data asset, the device being used to attempt to access the protected data asset, the specific action (e.g., opening a document) for which permission is being requested, the specific resource that is being requested to be accessed, network attributes, security attributes, the physical/geographic location of a user and/or device, the physical/geographic location of another user and/or another user device in relation to the user device through which the data asset is being accessed (or the physical distance between such devices, the availability of a wireless connection between the devices, or determining whether the two devices are on the same wireless access point (WAP), among other examples of determining distance and/or physical/geographic locations and relationships), various measures of time (such as, e.g., the time of day, or the length of time that has elapsed since a past event or authorization), the device type, the software and/or operating systems available on the user device, biometric attributes of a user (such as, e.g., a thumb print or retina scan), the security posture of a user and/or device, the result (e.g., a previous denial or grant of permission) of a previous authorization request, hardware root of trust presence, and/or the reputation of a user, device, and/or network or sub-portion thereof, as well as a virtual location of a user or device (e.g., the location of an avatar within a virtual environment).

Although a policy could be defined in light of a single such attribute, in practice policies are generally defined based on a combination of such attributes. For example, in one embodiment a policy may only allow a first user (e.g., an associate attorney) to open and/or continue to access a certain document if second person (e.g., a higher-ranking attorney, such as a partner) is in the same room, or within a certain distance of the first person. As another example, in one embodiment a policy may only allow a first user's device (e.g., a laptop computer) to open and/or continue to access a certain document if a specified second device (e.g., the user's cellular phone) is in the same room, or within a certain distance of the first person. This relationship constraint can be used to prevent, or remove, access to the document if the two devices are (or become) separated by more than the allowed distance, which could be assumed to indicate that the user (who presumably is carrying the second device on his person) has somehow been separated from the first device (e.g., the laptop computer), and access or continued access is (no longer) safe. In one embodiment, distance (such as is discussed in this paragraph, and elsewhere in this disclosure) can be determined, for example, by considering geographic distance between the devices, based on the availability of a wireless connection between the devices, by requiring the two devices to be on the same wireless access point (WAP), or by some other mechanism.

The foregoing paragraph includes examples of situations in which one person's access rights can be dependent on a second person's location. Similarly, a policy may only allow a first person to access a protected data asset if a second person, who may not be trusted for various reasons, is not in the same room or within a certain proximity to the person requesting access to the protected data asset. Due to the location tracking functionality discussed herein, system 100 can determine such information by monitoring events related to the second person (such as, e.g., the current geolocation of the second person's cell phone) without requiring the second person to expressly log in to the system.

Moreover, one or more distinct attributes (e.g., location of the user device, and software applications installed on the user device) can be combined in other manners to define a policy.

At a high level, a policy, as it is referred to herein, is defined and stored in a policy store, such as is discussed in more detail in connection with FIGS. 1A and 1B herein. An administrator can specify a policy in the form of attributes (such as, e.g., location or security posture) and asset resources (e.g., digital data assets or groups of digital data assets). In one embodiment, the attributes can be weighted. The rendering of the policy depends on policy information sources, and can accept information as inputs from a disparate set of sources, in order to provide context about the actors (e.g., user/groups) and their associated resources (e.g., documents/groups). For instance, an identity services engine (ISE) can be used to provide information regarding the identity of the user and/or device. Such an ISE will have a rich set of primitives regarding elements such as user, device, and network, which can be incorporated into policy schemes in accordance with this disclosure.

Moreover, a location technology (e.g., a connected mobile experiences (CMX) technology, such as that offered by Cisco Systems, Inc., of San Jose, Calif.) can also be used to provide location information as a policy attribute. For example, a policy can stipulate that documents can only be accessed while on an institution's campus, or even in a certain room or rooms of a building, and such information can be ascertained and delivered via CMX. Other identity and location services can also be used in conjunction with this disclosure. In one example embodiment, location policy can also be implemented via a cookie. Locations can be mapped to zones in CMX and the location system tracks the movement of users. In such a situation, when a user's location changes, CMX can inform the policy service of the change, and the impact of the location change can be evaluated against the policy instance. Moreover, when a location cookie "expires," a revalidation request is sent to the policy service, and the appropriate result can be returned to the client. Furthermore, other aspects of the policy can also be periodically re-evaluated as defined in any given policy or situation.

A policy server such as that described herein can dynamically bind the policy to "live" data and render a policy for the consuming user device (e.g., a client computing device, which includes, e.g., a secure agent, in addition to hardware and other software or a so-called web-agent running in a cloud environment). As the information is updated, the policy instances are also updated, ensuring that the state of the system reflects the most currently-available information. For instance, using location as an example, when the user (or the user's device) moves, that movement is tracked and the appropriate policy container is updated. The change of this attribute is then used to ensure correct enforcement based on the new location (or other changed attribute). The policy is enforced via client software (e.g., a secure agent) that retrieves the rendered enforcement rules (via the data access control server, which is discussed in connection with FIG. 1A, below), and can then decrypt or re-encrypt the data asset(s) as necessary and appropriate. Further, the system supports rendering the appropriate policy, in the appropriate format, for a range of agents: as long as the agent can perform the requisite enforcement, the policy can be represented for that agent and the model for agent interaction can vary to include push, pull or a combination of the two.

In one embodiment, a policy is created by an administrator via a user interface or an API. A policy session is associated with a specific client and contains the policy instances for that client. When a client registers with a policy service, a session is created and instances for that client are added to the session. At that point, the policy is ready for rendering. In one embodiment, a client requests entitlements via an API, such as, e.g., the REST API, which triggers the aforementioned rendering via an appropriate client-specific render. In one embodiment, a JSON document is returned, containing the authorized document group, associated timer values (e.g., expiry, revalidation, etc.), and the session of cookies representing the context attributes.

In one embodiment, a client (or agent on the client) requests access to a specific data asset based on a value uniquely identifying the data asset (e.g., "asset_ID"), and a policy service determines whether to allow or deny the requested access. If the access is allowed, the policy service returns a key with a specific time validity. After the key expires, the client (or agent) should, optimally, revalidate access to the data access. In this embodiment, the client (or agent) does not have to retrieve and manage a list of entitlements. Rather, the client (or agent) can request information for specific asset(s) when access to those specific asset(s) is requested.

In certain embodiments, formats other than JSON are used. In one embodiment, clients request initial entitlements, revalidation and context verification (via the encryption server) via an API (such as, e.g., REST) and those entitlements, revalidations, and context verifications are returned in JSON or another suitable format.

In one embodiment, the policy is pushed from the policy store to a user device (e.g., a client computing device, which includes, e.g., a secure agent, in addition to hardware and other software) once a given policy is created or otherwise defined. As is discussed in more detail in connection with FIGS. 1A and 1B, secure agents according to the present disclosure include the necessary software components to provide functionality such as that described herein. In one aspect, functionality such as that described in this disclosure is independent of the underlying software program (e.g., MICROSOFT® WORD®) that is used to create, access, modify, or otherwise process or manipulate the decrypted data asset. In certain embodiments, however, specific underlying software programs may be either required or prohibited by the policy in order for access to be granted to the document in the first place. For instance, a policy may specify that a high-importance document can only be opened by trusted word processing programs, such as MICROSOFT® WORD® or APPLE® PAGES®, but may exclude other unknown or untrusted word processing programs (which could be more susceptible to malicious use, such as spyware, once the document has been decrypted). Similarly, in one aspect, functionality such as that described in this disclosure is independent of the underlying operating system. In certain embodiments, however, specific underlying operating systems may be required (at least in the alternative) or prohibited, for reasons similar to those provided above with respect to the underlying software programs. For instance, an operating system such as, e.g., MICROSOFT WINDOWS® or MAC OS® may be designated as trusted by the policy, whereas an open-source platform such as, e.g., LINUX®, may not be trusted in certain situations. Likewise, this disclosure can be used in conjunction with any mobile (or other) operating system (e.g., iOS® or ANDROID®), although a policy may specifically designate certain operating systems as being, or not being, trusted or otherwise permissible for use (or untrusted and/or otherwise prohibited).

In addition to the underlying software program that is used to open or view the decrypted data asset, methods and systems according to the present disclosure also provide for the use of secure software for performing certain of the validation and policy-related operations disclosed herein. Such secure software may take the form of a stand-alone software program, an add-in to another software program, software code, software running on a cloud service, a compiled binary library, or another appropriate form of software (collectively, a "module"). In any event, methods and systems according to the present disclosure generally do not allow the underlying software program to decrypt the data asset without the functionality provided by the secure software module working in conjunction with methods and systems according to the present disclosure. Thus, such a policy can, for example, be enforced at the endpoint device (i.e., the device by which the data access attempt is made).

In conjunction with the installed software (e.g., word processing software), the secure agent in the cloud or on a user device (e.g., endpoint or other client computing device) uses the policy (and information included in that policy) to determine whether the user device can provide access to the given digital data asset or group of digital data assets. In one embodiment, access to a protected data asset will be provided via a separate software application, but only after the secure agent determines that the secure data asset may be decrypted and accessed. Post-decryption, the various timers can be used to ensure that the entitlements are current, that the keying material is up-to-date, and that the validity of dynamic attributes such as location remains current. In one embodiment, this information and other information can be stored in a cookie, or other identifying encoded information, on a user machine or on a data access control server.

In one embodiment, the system and methods disclosed herein distinguish between users and clients. To that end, a user can be viewed as the actual identity of an authenticated individual, e.g., Alice or Bob, whereas a client represents a specific user on a particular device. For example, a client can be identified as "Bob" via a UUID that uniquely maps a specific user (e.g., bob@abc.com) and the device being used (e.g., his tablet computer). If a given user registers on another device (e.g., Bob also has a laptop), then Bob's new registration would generally include a distinct UUID. In one embodiment, clients can present themselves to an encryption service (such as, e.g., encryption services module 162), which in turn registers known clients with policy service 110. User information can be learned from ISE, both as a directory and a proxy for external directory stores. ISE information can contain, for example, a username (user@domain.com), group information, and other session information about a specific user's active session. User information from ISE can be used in conjunction with the client registration to render a policy session for a given user and client. ISE can also contain the mapping of an authenticated user to an ISE group, as well as the session specifics such as device type, IP address, and so forth.

In one embodiment, this determination is based, at least in part, on the specific geographic location of the user device, such as can be determined with the precision of global positioning system (GPS) or other geolocation technology. For instance, in one embodiment, the policy may use the actual geographic position of the device in combination with a user identification and a device identification, in order to determine whether an approved user is using an approved device in an approved location. This combination of parameters adds meaningful level of additional security, in order to protect against malicious or even accidental activities (such as, e.g., accidentally emailing a confidential document to the wrong person) by ensuring that the document is accessed not only by an approved person and machine, but also in an approved physical location.

The data asset (e.g., a document) for which the policy is being evaluated is encrypted prior to policy evaluation. Upon being encrypted or otherwise protected from access, the digital access can be referred to as a protected data asset. In one embodiment, a user (e.g., by way of a user device) can only access a protected data asset (e.g., an encrypted document) if that user is determined to be an authorized user, who is attempting to access the protected data asset on an authorized device, and is doing so while using an authorized application in an authorized location. Until those conditions are satisfied, the protected data asset is encrypted and unreadable. In other embodiments, different criteria may be used to determine when to grant access (e.g., decrypt) the protected data asset.

Access to a data asset is granted if the policy requirements are satisfied. In one embodiment, access is granted by an exchange of digital tokens and/or related decryption key information (collectively, "decryption materials") that allow the secure agent to decrypt the document. Absent the decryption materials, which are only provided if the user is properly authenticated (which generally requires the policy being satisfied), the user device will be unable to allow the installed application software to open the document (e.g., because the document will remain encrypted, and thus cannot be opened). Moreover, a user device (or a cloud-based device) that is not equipped with a secure agent will be unable to validate the user and/or device attempting to access the secure data asset, and therefore will not be able to decrypt or otherwise access the secure data asset. Accordingly, methods and systems according to the present disclosure provide increased security that prevents, e.g., unauthorized users from accessing a secured asset but also prevents even authorized users from accessing a secured asset when the user or device attempts to access that secured asset at a non-approved location or when other such criteria are not met.

A system implemented according to methods and systems such as those described herein provides for the application of a core policy service and/or context information from one or more information sources. Such a policy service is able to ingest and store such information, and then describe a language that describes the policy using attribute information that is relative to a resource or group of resources, such as, e.g., a document or group of documents, as well as other examples discussed in more detail herein. High-level overviews of an implementation of such systems are provided as examples in FIG. 1A and FIG. 1B.

Example Policy Service System

FIG. 1A depicts system 100, which includes policy service 110, including session store 112, policy store 114, and event store 116. Policy service 110 provides a "source of truth" for the asset protection system by specifying what users and user devices are allowed to access which digital data assets and under what conditions, such as the conditions described elsewhere herein. Although not expressly depicted in FIG. 1A, policy service 110 provides a series of application programming interfaces ("APIs") to various sources and consumers of needed information. For instance, the operator/administrators interface utilizes north-bound APIs for policy administration or other interactions with the system. Policy entitlement APIs can be utilized for policy retrieval and (re)validation. The data access control service as well as authentication and location services interface with the policy server via respective APIs.

Moreover, a multi-protocol messaging layer can be used to facilitate communications between other components, such as those described in the present disclosure. Such a messaging layer can be used for event generation and the exporting of security information for data analysis and reporting, external information points such as ISE and location services, registration details of encryption clients, and ingestion of asset classification information, such as policy information inputs 118(1)-($n$) (collectively, "policy information inputs 118"). Policy information inputs 118 provide the attributes needed to define and enforce policy. The information provided can range from mandatory (e.g., an identity services engine (ISE) session information) to optional (e.g., security posture). Regardless of the type of information provided, information sources utilize a multi-protocol message system to provide their data to the policy system.

Dynamic information sources can also be used. By its very nature, this information might change frequently, and those changes can be used by the systems and methods disclosed herein to enforce policy. Because secure agents (e.g., user devices) do not necessarily have to be aware of most of the policy information specifics, the interaction of the dynamic attributes on the client device can be performed via encoded data (e.g., cookies). Thus, when a policy server receives policy information, the policy server creates a policy instance that in turn references the contextual information. This context can be passed to the client encoded in a token (e.g., cookie), or explicitly evaluated and convey in a policy decision, with a time value, such as is defined, e.g., by the administrator. When a timer or time value expires, one or more dynamic attributes can be re-checked against the instantiated policy on the server and the appropriate entitlements, based on context, are returned to the inquiring system. The token (e.g., cookie) can be provided in JSON, or in another suitable format.

Session store 112 can be a database or other memory used to store information about a current user session. Policy store 114 can be a database or other memory used to maintain internal APIs. These internal APIs can provide storage objects and other functionality used to store policy-centric information, including, e.g., registered clients, active user session information, attributes/context information, and policy objects. Event store 116 can be a database or other memory used to store information about events that are generated by the system and methods disclosed herein. As but some examples, events can be the creation or update of a policy, a request by a user to perform a certain action (such as, e.g., opening a protected data asset in a specific location), a client or secure agent that enforces a policy (or makes a request to enforce a policy in a given situation), or information about a user's or user device's location and movement. Also shown in FIG. 1A are various policy information inputs 118(1)-($n$) (collectively, "policy information inputs 118"), which are discussed in more detail throughout this disclosure.

Policy service 110 allows an administrator or other such individual to express a desired policy as a composite of attributes. For example, a policy can specify attributes or requirements such as (1) allowing members of an "Engineering Group" to access any engineering documents (i.e., documents identified as being created by, the responsibility of, or otherwise associated with that group); (2) allowing members of a "Finance Group" to access any finance documents (i.e., documents identified as being created by, the responsibility of, or otherwise associated with that group), but only at their respective desks and/or in their respective offices; and (3) allowing a specific user to access a specific document while in his office. Of course, these are but a few examples among many other examples that are possible in practice.

FIG. 1A also depicts data access control server 120 and user device 130. Data access control server 120 and user device 130 provide the foundation for the protection functions (e.g., encryption, decryption, and application integrity functionality) according to methods and systems such as those described in the present disclosure. Data access control server 120 supports secure communication between user device 130 running on the end point device and policy service 110. Data access control server 120 interfaces with policy service 110 to receive user entitlements, manage protection information (e.g., a key store), provide initial provisioning and a secure communication link to user device 130, and manage the integrity of the approved applications and/or modules, as requested and appropriate. In one embodiment, data access control server 120 is used to encrypt (or otherwise protect) the data asset before transmitting that data asset (as a protected data asset) to user device 130. In other embodiments, a data asset is encrypted by software on the computing device that initiated the transfer of the data asset to user device 130 (e.g., the computing device upon which the data asset was either created or "last modified"). There are multiple services that run in these layers to provide the full suite of data access control as may be needed by the data access control server and user device 130 and/or secure agent 136.

In slightly more detail, data access control server 120 provides key store 121; backend services manager 122, which in one embodiment includes software signing module 123, software wrapping module 124, and bulk encryption module 125; server software 126 (e.g., moving target server); software integrity manager 127; and secure gateway 128. Key store 121 can be used to store and provide decryption keys as needed for use by secure agent 136. Backend services manager 122 is used to provide foundational elements for a platform according to embodiments such as those depicted in the present disclosure, such as software signing via software signing module 123, software wrapping via software wrapping module 124, and bulk encryption via bulk encryption module 125. Software signing module 123 can be used to digitally sign software that is authorized to work with a given digital data asset or assets. As such, software signing module 123 provides application integrity for custom or off-the-shelf enterprise desktop applications. Software wrapping module 124 wraps mobile applications with a well-established technique in order to provide application integrity. Bulk encryption service module 125 is used to perform a bulk level encryption of a file store, which can be used to provide encryption on files in conjunction with this disclosure. Server software module 126 performs and controls various aspects of data control server 120's functionality, such as those provided in or otherwise used in conjunction with methods and systems such as those described in connection with the present disclosure. Software integrity module 127 is software used to track authorized software signatures, such as those produced by software signing module 123. In one embodiment, software integrity module 127 stores the authorized software signatures as a list in a flat file. In other embodiments, software integrity module 127 stores the authorized software signatures in a database, log file, or other suitable data structure for storing such information. Secure gateway 128 provides a secure gateway interface between data access control server 120 and user device 130.

User device 130 (e.g., a client machine, such as a desktop computer, laptop computer, tablet computer, cellular phone or other mobile device, web application agents, or any other computing device capable of being configured to implement the necessary features provided herein) includes an operating system 132, software application(s) 134, and secure agent 136, as well as other software and hardware (e.g., RAM, a non-transient memory, a microprocessor, and so forth). User device 130 can also store protected digital data assets, such as protected data 138. Moreover, although protected data 138 can certainly be stored at least temporarily (although still in non-transient computer memory) on user device 130, as is depicted in FIG. 1A, protected data 138 can also be stored at other locations within FIG. 1A (such as, e.g., policy service 110 and data access control server 120), as well at other locations both within and beyond the system depicted in FIG. 1A (e.g., in the cloud, or on the computer of a user who authored, modified, protected, or transmitted the data asset in the first instance). As discussed elsewhere herein, operating system 132 can be any operating system in principle, although in practice a given policy may require or prohibit certain operating systems from being used in any given instance. Similarly, software application(s) 134 can be any software applications in principle, although in practice a given policy may require or prohibit certain software applications from being used in any given instance.

Secure agent 136 enforces a policy locally (e.g., on user device 130) when a user or device attempts to access a protected data asset on that user device. User device 130 receives the policy determination (e.g., whether access to protected data asset or assets should be granted) from another device, such as policy service 110, data access control server 120, encryption server 160, or some other computing device that is configured to make such a determination. If a determination to allow access to a protected data asset is made, then the associated tokens and keying material used for decryption are provided to secure agent 136. In one embodiment, such materials are provided by either policy store 110, data access control server 120, and/or encryption server 160. Further, the user device generates events about the enforced policy and communicates those events to a system such as, e.g., the system disclosed herein. In one embodiment, secure agent 136 is software (such as, e.g., moving target client software), and serves as the local root of trust and provides local policy enforcement functionality in accordance with the systems and methods disclosed herein. There are multiple components to the secure agent but its general functions are to (1) serve as the communication link between the data access control server 120 and user device 130; (2) detect the startup of an application (process) requiring policy enforcement in accordance with this disclosure; (3) verify the application(s) opening the file was/were indeed the application(s) specified by an information technology (IT) department, an administrator, or some other person or group; (4) perform the decryption function; and (5) keep logs and generate events.

Location tracking services can also be included in user device 130, which can provide various functionalities, such as may be needed to provide relevant information to a location tracking server, including various modules that can be implemented in such a location tracking server, all of which is discussed in more detail below in connection with FIG. 1B. Specific examples of location tracking services can include GPS functionality, short-range communications functionality (e.g., BLUETOOTH), identification functionality (e.g., radio frequency identification (RFID) functionality), wireless and/or cellular networking functionality, and the like.

Also depicted in FIG. 1A is user interface 140, which provides a cloud-based interface for different administration and user domains. In one embodiment, user interface 140 is built upon the infrastructure used for cloud-based VPN services. In one embodiment, user interface 140 provides for interaction between the administrative domains and the end user. User interface 140 allows an administrator to specify both policy and monitoring functions independently of one another. As depicted herein, user interface 140 includes end user interface 142, administrative interface 144, security control interface 146, and event monitor 148.

FIG. 1A also depicts data analytics and reporting system ("DARS") 150, which provides various services related to the systems and methods disclosed herein. As shown in FIG. 1A, DARS includes NLP service module 151, data asset classification module 152, audit service module 153, machine learning module 154, and analytics module 155. The event data generated by the systems and methods disclosed herein can provide important insight into the state of the system, data access patterns and policy violations. Additionally, machine learnings techniques can be applied to the data to dynamically generate and/or refined policy. In various embodiments, the data service can provide access to data for administrator troubleshooting/verification, provides access to data for compliance verification, perform data analysis for baseline and policy deviation detection, and provide automated feedback to the policy service to update policy based on observed behavior.

In certain embodiments, digital data assets are classified in order to be appropriately encrypted and subject to policy enforcement. Such functionality is provided by data asset classification module 152. Such classification can range from relatively simple (e.g., identifying a data asset as an "engineering" document) to more granular (e.g., identifying a data asset as a "finance" document, and further identifying that document as "regulated"). Further, classification methods may vary and can include implicit classification based on storage location, explicit user input or machine learning techniques. Regardless of the method used to classify the asset, the result of classification can be associated with the asset and consumed by the encryption system when the asset is ingested into the system described herein.

Additionally, FIG. 1A depicts encryption server 160. Encryption server 160 is a server configured to perform one or more encryption services, such as can be used in conjunction with the systems and methods provided in this disclosure. In the embodiment shown, encryption services are performed by encryption service module 162, which is a software module configured to encrypt digital data assets. In the embodiment shown, decryption services are performed by decryption service module 164, which is a software module configured to assist in decrypting protected digital data assets, such as by providing a decryption key, token, or other decryption information. In certain embodiments, the encryption server is designed to provide a logical representation of the participating clients to the policy service. When a client device is added to a system, such as system 100, the encryption server updates policy service 110 with the necessary and/or relevant information. In these and other embodiments, encryption server requests, on behalf of clients, policy determinations (or decisions) that are used to enforce client asset access. Encryption server 160 is designed to manage responsibilities related to core cryptographic functions, such as, e.g., asset encryption, token and key generation/re-generation and distribution, and/or other such functions. Encryption server 160 can also be tasked with the generation of events for consumption by other components of a system architecture such as that depicted in FIG. 1A. Although encryption server 160 is depicted in FIG. 1A as being communicatively coupled (e.g., via a network connection) to policy store 110 (as evidenced by the solid line representing a connection), in practice encryption server 160 may be communicatively coupled (either directly or indirectly) to other components of the system, such as via the alternate connection to data access control server 120 represented by the dotted line in FIG. 1A.

Additionally, in various embodiments, secure agent 136 and encryption server 160 can, either collectively or individually, perform data asset encryption including metadata imposition; perform key generation, management and distribution; perform token generation, management and distribution; interact with policy service 110 to receive entitlements and/or re-validate existing entitlements (e.g., entitlements can be thought of as access permissions for a given user, machine, and/or data asset), enforce client policy, and generate events.

Although system 100 is discussed with respect to the specific configuration depicted in FIG. 1A, in practice many other configurations are possible. The system and methods described herein embrace design principles of loose coupling. The only communications between components that are necessary are those facilitated by the application programming interface (API), but each component can evolve as required. Moreover, policy service 110 can generate policy decision in any format required by the end point (e.g., user device 130 and/or secure agent 136). Additionally, asset classification is an evolving area, with varying requirements based on customer use cases. To that end, the system and methods described herein require that a data asset is classified, and but does not necessarily require any specific method or granularity of classification to be used in making that classification, although the methods disclosed herein are certainly valid embodiments that can be used to make such a classification.

Figure 1B:
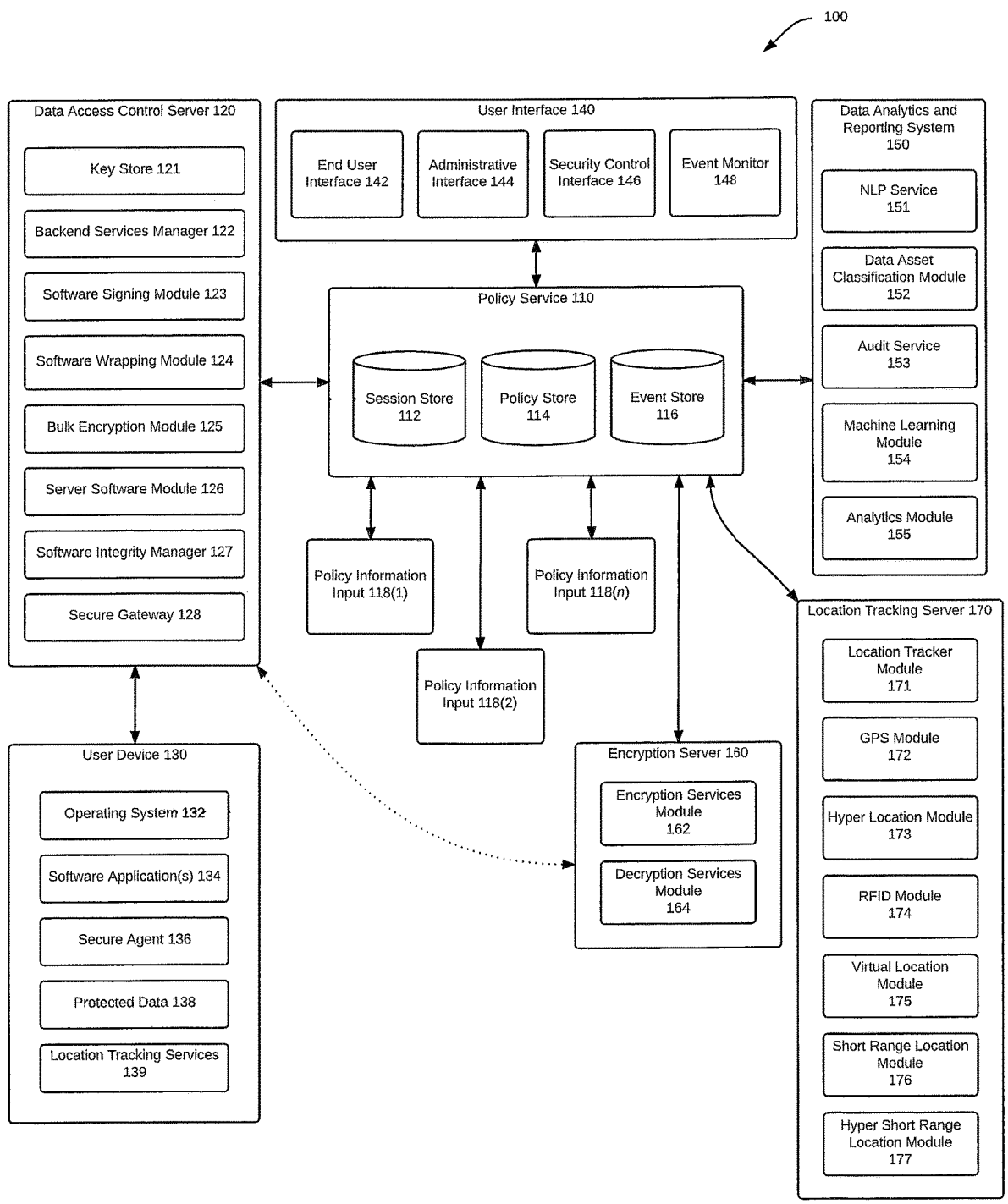
FIG. 1B is a block diagram of a system, such as that of FIG. 1A, which includes location functionality, according to one embodiment.

FIG. 1B is a simplified block diagram depicting a system, such as that of FIG. 1A, which includes location functionality, according to one embodiment. As will be appreciated in light of the present disclosure, the basic mechanisms and constructs depicted in FIG. 1B follow those depicted in FIG. 1A. In addition, FIG. 1B also depicts location tracking services 139, shown in FIG. 1B as being installed in user device 130. Location tracking services 139 can include functionality to support the gathering and generation of location information. Such functionality can include, for example, mechanisms such as global positioning system (GPS) functionality (e.g., a GPS receiver), short-range communications (e.g., by way of BLUETOOTH or comparable technologies), near-field communications (NFC) transceivers, wireless data communications (e.g., WIFI), cellular communications (e.g., mobile telecommunications technology such as that conforming to $3^{rd}$ generation (3G; International Mobile Telecommunications-2000 (IMT-2000) specifications) or $4^{th}$ generation (4G; including the Mobile WiMAX standard and the Long Term Evolution (LTE) standard) cellular communications standards), light-based communications (e.g., infrared transceivers), and/or the like, as well as software support therefor. As noted elsewhere herein, a combination of hardware and/or software can be used to implement one or more of these functions. Further, it should be appreciated that certain of the processing, such as that described in connection with the location information processing modules described below, of locally-generated information (e.g., GPS information, cellular location information, and other such location information) may be susceptible to processing (in whole or in part) at the user device, and that in reporting such information to policy service 110 and/or location information processing servers, such processed location information can instead be provided.

In support of the location information thus generated and/or gathered, and to provide location information in addition thereto, the architecture of system 100, as depicted in FIG. 1B, also includes a location tracking server 170. Location tracking server 170, in turn, can include a number of modules. As depicted in FIG. 1B, location tracking server 170 includes a location tracker module 171, a GPS module 172, a hyperlocation module 173, an RFID module 174, a virtual location module 175, a short-range location module 176, and a hyper-short-range location module 176.

Location tracker module 171 coordinates the operation of and processing performed by the other modules of location tracking server 170. As will be appreciated in light of the present disclosure, location tracker module 171 collects location information and events from one or more of the modules of location tracking server 170, and either (1) sends the aggregated information to policy service 110 (for use in the processing of access requests from user devices such as user device 130 based on one or more policies maintained by policy service 110), (2) performs policy processing with respect to location information based on the location information thus aggregated (on behalf of policy service 110), and/or (3) some combination thereof (e.g., pre-processing certain location information (either of its own accord or based on policy information sent to location tracker module 171 by policy service 110), and sending results of such pre-processing and the remaining location information to policy service 110).

In cooperation with GPS information obtained from location tracking services 139 of user device 130, for example, GPS module 172 processes such (physical) location information for ingestion by location tracker module 171 and/or policy service 110. As will be appreciated in light of the present disclosure, such location information can be used to prevent or allow access to digital data assets only from certain physical locations (e.g., only while the user+device is on premises), only when the digital data asset is in certain locations (e.g., a data asset is stored at an enterprise's servers), and/or for exclusionary purposes (e.g., an enterprise's digital data assets can never be accessed when the user+device is at a convention center, unless within the enterprise's trade show booth (as further evidenced by a connection via the booth's WAP)).

In this regard, hyperlocation module 173 provides location information for a user device by way of wireless access (e.g., using a device's wireless networking facilities to identify location by, e.g., connection to one or more WAP access points, through the use of hyperlocation technologies, and other such mechanisms, and/or a combination thereof). Such functionality can be provided, for example, by way of battery-powered BLUETOOTH low-energy (BLE) beacons, location by wireless access points, and/or a combination thereof. Such alternatives are particularly attractive in the indoor enterprise space.

In comparable fashion, RFID module 174 supports the identification of a user, device, or other such entity by way of transceivers mounted in various locations. Thus, if an RFID is "pinged" upon entry to and exit from various facilities, rooms thereof, or other such spaces, the user's/device's location can be known to a certain degree. Short-range location module 176 (also by way of, e.g., BLUETOOTH or comparable technology) and/or hyper-short-range location module 176 (e.g., supporting near-field communications (NFC) technology or the like) can also be used to locate users and/or devices, for example. In this regard, triangulation by cellular communications can also be employed to good effect. As will also be appreciated, location tracking server 170 can also implement (e.g., via location tracker module 171) support for video and other image processing, in order to identify users and/or devices within an enterprise workspace or other location, and thereby add an additional layer of security and control to the policies supported by policy service 110.

Virtual location module 175, by contrast, supports determination and tracking of location in a more logical/conceptual realm. This can include location of a user/device with respect to their location in a network (e.g., by observing to which subnet the user/device is connected), be that network a cellular network, a transmission control protocol (TCP)/internet protocol (IP) network, wireless network, or other network, and/or combinations thereof. Moreover, a user's location can be virtual; for example, the location of a user's avatar in a virtual world, or other such conceptual representation. This is to say that "location," as used herein, can be thought of in its broadest sense.

As will be appreciated in light of the present disclosure, and as noted earlier, the processing of such location information can be performed in any of the components of system 100. Thus, some or all of the requisite processing can be performed at any or all of user device 130, location tracking server 170, policy service 110, and/or any of the other servers depicted in FIG. 1B, as may be advantageous based on communication bandwidth available, computational resources available, storage resources available, and/or other such considerations. Furthermore, based on location information such as that described herein, the location of more than simply a single user/device can be taken into account, either alone or in combination with the location information regarding the data asset(s) in question. Thus, for example, a data asset might only be accessible if a particular two users were physically located sufficiently close to one another, were attempting to access the data asset via the same WAP, were both authenticated by the same biometric sensor (or sensor type), and/or taking other such factors into account. Further still, it is to be appreciated that, as used herein, a data asset is intended to represent a document, video, image file, or the like; similarly, a data asset includes such data assets, but can also be a computing device at which a data asset is located, a computational resource (e.g., a video camera or server), a mobile device, or other such asset. For example, then, a policy could direct that an on-premises server only be accessed if the user device were also on-premises, accessed the data asset via a wired connection, used a certain device type, and/or the like.

Generating and Using Events Related to Policy Enforcement

The system and methods provided herein also have the ability to gather, monitor and analyze events that are generated by the system to provide feedback into the system in order to alter policy and to prevent or warn about potential malicious accesses (or any such access attempts) to protected digital data assets. In one embodiment, such functionality can be performed by a data analytics and reporting system, such as, e.g., data analytics and reporting system 150. In one embodiment, the system and methods disclosed herein can use the various types of events that are available to the system as input to a machine learning layer that can then develop and take action to influence the policy decisions made by the system.

The systems and methods disclosed herein rely upon a range of information sources (e.g., policy information inputs 118) to provide the attributes that are requested and evaluated by policies, as that term is understood in light of this disclosure. The complexity of policy creation and maintenance in a system such as that described herein is an impediment for deploying such policy systems, and even more so when implementing policy systems that provide for a rich set of policy parameters. This disclosure describes the use of an analysis system (such as, e.g., data analytics and reporting system 150) to provide information to the system and methods disclosed herein in order to mitigate the complexity associated with granular policy.

User devices (e.g., user device 130) that are operated in conjunction with the systems and methods disclosed herein can generate a high volume of data, and that data can reveal behavioral access patterns regarding the user device as well as the protected digital data assets which that device is accessing or attempting to access. Some of the generated data can be reported to and consumed by the system (such as, e.g., system 100) as an event. In its simplest form, an event is a computerized notification or message that describes the client and user, the document being accessed (or the document to which access is being requested), a policy decision, or any other relevant attribute, such as the set of attributes associated with the client (e.g., UserName, DeviceID, device location, installed software applications, and so forth) that were used to render the initial policy decision.

For example, events generated by a secure agent (such as, e.g., secure agent 136) can demonstrate a particular fact, e.g., the fact that doctors employed by a certain hospital often need to open patient records in the cafeteria, rather than just in their offices or in patient rooms. As another example, generated events can also demonstrate that a salesperson often review customer proposals at a local coffee shop, rather than only at his or her office desk. Conversely, a generated event can indicate that a trusted user is attempting to access a protected data asset at a location that is expressly prohibited by a policy, such as, e.g., a lawyer attempting to access a privileged and confidential legal document on a golf course. Generated events can also take other forms, including information generated by a computing device and can include information that is only machine readable that is not observable by humans and/or that is not readable in any meaningful way by a human apart from a machine, such as, e.g., geolocation of user device 130, processor speed of user device 130, currently available memory on user device 130, currently available RAM on user device 130, currently available network bandwidth, and so forth. Generated events can also include information such as, e.g., information associated with the security posture or reputation of the user and/or a user device, as well as the reputation of other components of the user device or of the system, such as, e.g., MICROSOFT® WORD® may have a good reputation as a secure word processing program, but other word processing software may have an unacceptable reputation. Further, a user, device, software program or the like can accrue a reputation over time. Such a reputation can reflect a history of accesses that comport (or do not comport) with the applicable policy/policies, the use of one or more devices and/or software packages in either regard, communications that comport (or do not comport) with the applicable policies) (e.g., the number of emails sent that are and/or are not acceptable), and/or other such actions.

The system can consume and process generated events in such regard. In one embodiment, generated events can be consumed and processed by data analytics and reporting system 150 (or "DARS 150"). DARS 150 can use these events in various ways, such as generated alerts, expanding access rights, or contracting access rights. For instance, using the above example of a lawyer who attempts to access a protected digital access from a golf course, the system may simply generate an alert (e.g., an email) notifying a designated person (e.g., the offender's boss) about the event. In other situations, particularly (although not necessarily) where there are repeated events that fit a common pattern, the system may respond to those events by updating the policy to either expand or contract the rights under that policy. For instance, if salespeople consistently need to access sales quotes at a certain coffee shop, the system (e.g., data analytics and reporting system 150) can automatically update the relevant policy or policies to allow such access. Conversely, however, if a trusted executive continually attempts to access confidential material on her personal, unsecured email server, the system (e.g., data analytics and reporting system 150) may completely revoke her rights to access any confidential materials.

Once the system updates a policy in response to such generated events, the system may then use the updated policy to evaluate future requests for access to protected digital data assets. Moreover, the system may transmit information related to such update policy information to user devices in response to a pull request, or may push information related to such update policy information to user devices. In any of the scenarios covered herein, the information can be transmitted to the user device via a computer cookie, token, or other means of transmitting digital information between computing devices.

In addition, once a system component (e.g., data analytics and reporting system 150) updates a policy, the updated policy information may be transmitted to a centralized repository (e.g., policy service 110) and stored in a suitable memory location (e.g., policy store 114) for later use. The underlying events may also be stored in a suitable memory location (e.g., event store 116). Moreover, one of more of the steps discussed herein can be performed by a subcomponent of data analytics and reporting system 150, such as, e.g., NLP (Natural Language Processing) Service 151, Data Asset Classification Module 152, Audit Service 153, Machine Learning Module 154, and/or Analytics Module 155.

Communicating Information Related to Policy Enforcement

As alluded to above, policy enforcement is an important attribute of the system and methods described in this disclosure. However, user devices (e.g., user device 130) and secure agents (e.g., secure agent 136) do not necessarily have the ability to determine many of the attributes that control their access to protected digital data assets. As one example, although a user device can perform some location tracking services, hyper-location information generally cannot be derived by the user device itself. Moreover, even with respect to attributes that a user device has the ability to derive or determine on its own, efficiency (of the user device, the network, and the system as a whole) is improved when the user device is not required to support all such attributes. Thus, to further enhance policy enforcement in light of certain inherent limitations of many user devices, further functionality is described below consistent with the disclosure provided herein.

For instance, in one embodiment, the systems and methods described herein use a novel method to convey attributes to the user device (e.g., user device 130) without requiring the user device to track, monitor, or otherwise determine any of the underlying attributes that pertain to policy enforcement. (Although this functionality can be used to eliminate the need for the user device to track, monitor, or otherwise determine certain of the underlying attributes that pertain to policy enforcement, the user device is not necessarily prohibited from doing so, and in fact, such techniques can be used in combination to complement one another). In one embodiment, policy server 110 and/or location tracking server 170 (or one or more other components providing similar functionality) track one or more of the attributes that are needed for policy enforcement (e.g., location). Upon tracking and gathering the relevant information, policy server 110 and/or location tracking server 170 (or one or more other components providing similar functionality) can generate a cookie (or a token, encoded identifiers, or other such construct) that represents the attribute or attributes. Such cookie (or cookies) can also include other information, such as time value indicating when the cookie expires or when the validation must be re-requested. In one embodiment, a cookie includes a value identifying a digital asset (e.g., an "asset_ID" value) and a time bound key. Such a cookie or cookies is/are then conveyed to user device 130, which user device can then use the cookie to determine whether access to protected digital data assets may be granted during while the cookie is valid. In accordance with this method, the client is not required to have any insight into what the cookie represents, only that the cookie is valid for a given time period and must be "refreshed" when (or at some point after) the cookie expires (but in any event, once the cookie is expired, access to protected digital data assets will not be granted until the cookie is refreshed, or until the policy information is otherwise validated or re-validated). As one example, a cookie consistent with this disclosure include fields related to a user group ID (e.g., "ug_id"), a user group name (e.g., "ug_name"), a Boolean flag indicating whether the user+device combination is authorized in its current location (e.g., "pdp-authorize"), and a revalidation time or other variable indicating when the cookie expires (e.g., "revalidation"). As will be appreciated in light of the present disclosure, such functionality can be used not only to protect digital data assets such as, e.g., a document or spreadsheet, but also to control access to facilities protected using such mechanisms (e.g., a server on premises at an enterprise, other content (e.g., an internal web site), and other such digital data assets).

Unlike the user device, a server (such as, e.g., policy services 110 or data access control server 120) can have complete context associated with a cookie and can validate or revalidate the requested policy by using that context. For example, the "revalidation" field in the cookie can be given a value of 86400. In that example, the corresponding cookie can be checked or revalidated every 86400 seconds. In one embodiment, a cookie may only represent one attribute (such as, e.g., location) among the multiple attributes that are evaluated by a given policy instance. In the situation where the cookie being reevaluated represents location, the server (e.g., policy server 110) can reevaluate the cookie by comparing the present location of the user device (e.g., user device 130) with the required parameters of the policy, and then return the appropriate value (e.g., a Boolean value indicating whether the location is valid) to the user device (e.g., user device 130), which in one embodiment can be returned in the form of a new cookie with a new expiration time (e.g., a new "revalidation" value). A given user device could store many such cookies at one time, with each cookie representing one attribute among the multiple attributes required by a given policy, and with each cookie/attribute independently checked against a defined policy.

In addition to validation, encoded identifiers (e.g., cookies) can also be used in accordance with this disclosure to monitor and track events, which can be referred to as "eventing." An "event" can be generated by any component of system 100 whenever actions occur. The actions that will generate an event can be defined by an administrator, or otherwise. Some example actions that generate events are a user attempting to access a document from a given device, a user moving to a new location, a user's device moving to an unapproved location after gaining access to a protected data asset in an approved location, and so forth, among many other such potential event-generating examples. When a user device (such as, e.g., user device 130) generate an event, a system component (such as, e.g., policy service 110 and/or data analytics and reporting system 150, including the subcomponents of each (e.g., session store 112, policy store 114, and event store 116)) can use the cookie information to re-create the entire relationship between the event and the policy. For instance, the analytics system (such as, e.g., data analytics and reporting system 150) can receive a complete view of the user device's policy state by viewing the combination of the original cookie in conjunction with the event update, the latter of which can indicate what, if any, information in the original cookie has been updated.

Additionally, the aforementioned functionality regarding cookies and events provides additional flexibility and efficiency for the system (such as, e.g., system 100). Because the user device does not have to track, determine, or otherwise be aware of the underlying attributes that are evaluated by the policy, the user devices themselves do not necessarily have to be updated in response to a policy change. Accordingly, the system only has to update central components (e.g., policy store 110), rather than updating a potentially large number of user machines and then monitoring those configurations.

Figure 1C:
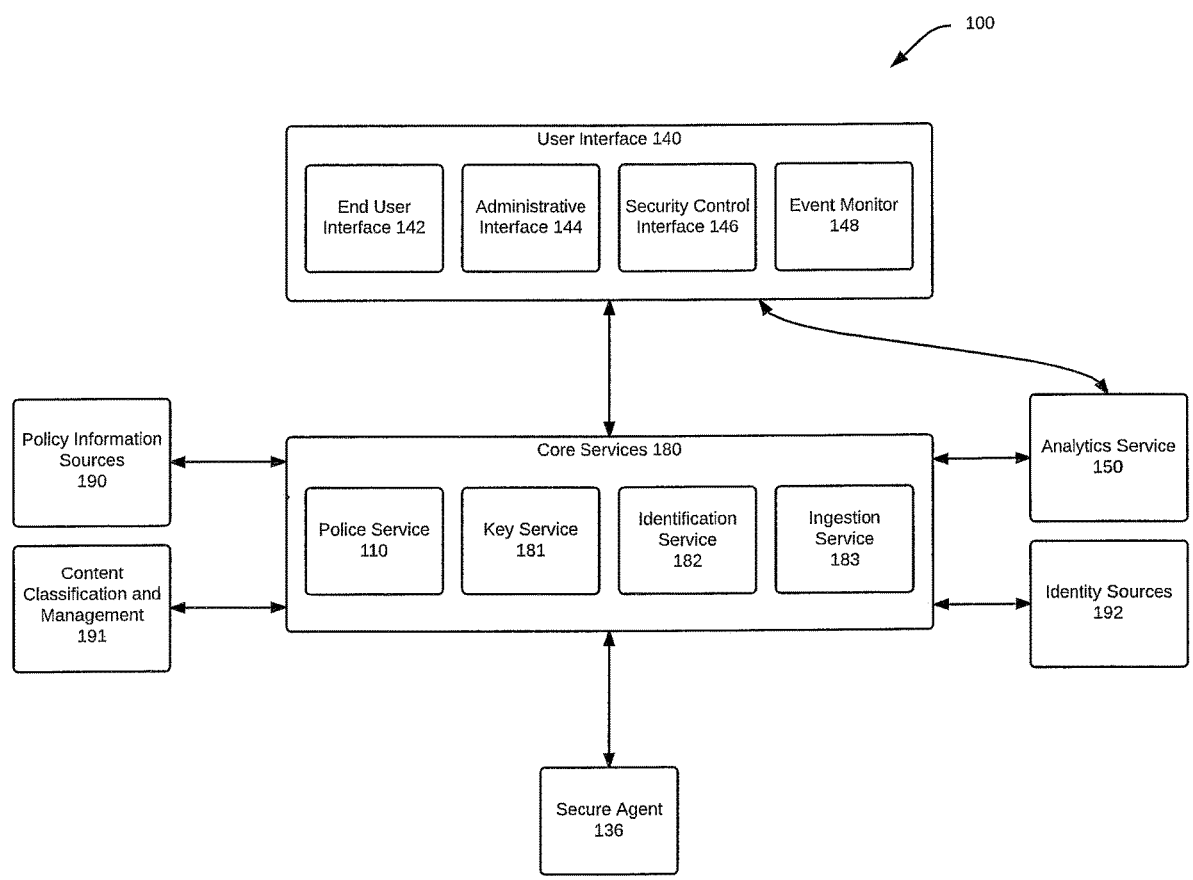
FIG. 1C is a block diagram depicting an alternative configuration and embodiment of the systems depicted in FIG. 1A and FIG. 1B, according to one embodiment.

FIG. 1C is a simplified block diagram depicting an alternative configuration and embodiment of the systems depicted in FIG. 1A and FIG. 1B, according to one embodiment. FIG. 1C depicts core services 180, which in this embodiment includes policy service 110 (and by implication, the component parts of policy service 110 from FIG. 1A and FIG. 1B, e.g., session store 112, policy store 114, and event store 116), key service 181, identification service 182, and ingestion service 183. Although not expressly depicted in FIG. 1C, core services 180 can also include an API gateway and session security management functionality.

Core services 180 can also receive input from (and otherwise communicate with) policy information sources 190, which can include, but is not limited to, GPS information, other location information, security information, and reputation information, such as are described elsewhere in this disclosure. Additionally, core services 180 can receive input from (and otherwise communicate with) content classification and management system 191, as well as analytics services 150, such as is described above and shown in more detail in conjunction with FIG. 1A and FIG. 1B. Core services 180 can also receive input from (and otherwise communicate with) identity sources 192, which can include, but are not limited to, a lightweight directory access protocol (LDAP), an identity services engine (ISE), and/or Active Directory (AD) functionality. Finally, core services 180 can communicate with a user via user interface 140, which can include end user interface 142, administrative interface 144, security control interface 146, and event monitor 148, among other potential components.

Example Network Architecture

Figure 2:
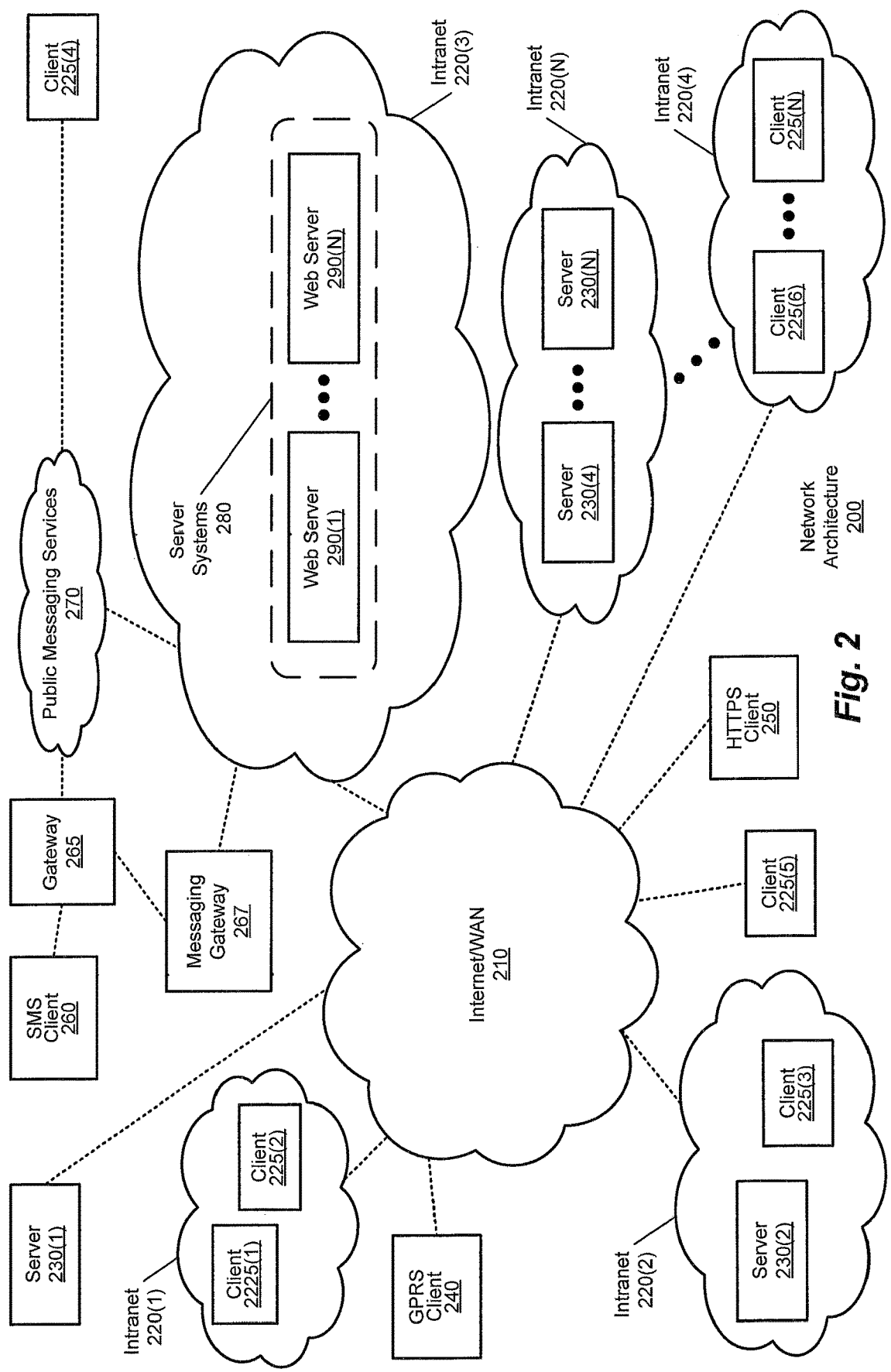
FIG. 2 is a block diagram illustrating an example of a network architecture, according to methods and systems such as those disclosed herein.

FIG. 2 is a block diagram illustrating an example of a network architecture 200 that includes a server system according to one embodiment. Network architecture 200 includes an internetwork (depicted in FIG. 2 as an internet/wide area network (WAN) 210), which is configured to couple a number of intranets to one another (depicted in FIG. 2 as intranets 220(1)-(N)). Intranets 220(1)-(N), in turn, can include a number of components, such as one or more clients (depicted in FIG. 2 as clients 225(1)-(N)) and/or servers (depicted in FIG. 2 as servers 230(1)-(N)). Clients 225(1)-(N) and/or servers 230(1)-(N) can, for example, be implemented using computer systems such as those described in connection with FIG. 3. Internet/WAN 210 thus communicatively couples intranets 220(1)-(N) to one another, thereby allowing clients 225(1)-(N) and servers 230(1)-(N) to communicate with one another (and can, in certain embodiments, provide for the servers of intranets 220(3) and 220(N), for example, to operate as cloud-based server systems). As is depicted in FIG. 2, clients 225(1)-(N) can be communicatively coupled to one another and to servers 230(1)-(N) as part of one of intranets 220(1)-(N), or directly via internet/WAN 210. Similarly, servers 230(1)-(N) can be coupled via intranet/WAN 210 via a direct connection to intranet/WAN 210, or as part of one of intranets 220(1)- (N).

Network architecture 200 also provides for communication via intranet/WAN 210 using one or more other devices. Such devices can include, for example, a general packet radio service (GPRS) client 240 (e.g., a "smart phone," a "tablet" computer, or other such mobile device), a secure web client (depicted in FIG. 2 as a secure hypertext transfer protocol client 250), and a basic cellular phone (e.g., using standard texting or other communication protocols, and depicted in FIG. 2 as a simple messaging service (SMS) client 260). HTTPS client 250 can be, for example, a laptop computer using the HTTP Secure (HTTPS) protocol. Support for GPRS clients, SMS clients, HTTP clients, and the like thereby provide users with communication functionality according to an embodiment in a mobile environment. As is also depicted in FIG. 2, SMS client 260 can communicate via internet/WAN 210 via several channels. SMS client 260 can communicate directly, for example, with a gateway 265, which, in turn, communicates with internet/WAN 210 via a messaging gateway 267 and, optionally, elements within intranet 220(3), for example. Alternatively, SMS client 260 can, via gateway 265, communicate with intranet 220(3) (and so, internet/WAN 210) via public messaging services 270 to which gateway 265 and intranet 220(3) are connected. As is also depicted in FIG. 2, a client 225(4) is also able to communicate via internet/WAN 210 by way of public communication services 270 and intranet 220(3). In order to support such communications, as well as other communications according to various embodiments, intranet 220(3) includes server systems 280, as well as (optionally) providing for a number of clients (not shown), in the manner of intranet 220(2).

Server systems 280 include a number of components that allow server systems 280 to provide various functionalities (e.g., supporting various communications, cloud-based services, cloud-based services, enterprise services, and so on). Among these components, in certain embodiments, are a number of servers, which can be implemented in hardware and/or software. Examples of such servers include data access control server 120 and encryption server 160, among other potential servers.

Servers such as those included in server systems 280 are designed to include hardware and/or software configured to facilitate functionalities that support operations according to the concepts disclosed herein, among other possible such components and mechanisms, in communication with one another (e.g., directly, via various application programming interfaces (APIs) and/or other such interfaces, and/or other such mechanisms and/or constructs). As will be discussed in greater detail in connection with FIG. 3, the server systems of server systems 280 provide such functionality, for example by presenting end-users with a website (functionality effected by, for example, web servers 290(1)-(N)). Such a website can be accessed by an end-user using a client computing device such as one or more of clients 225(1)-(N), GPRS client 240, HTTPS client 250, and/or SMS client 260. As will be appreciated in light of the present disclosure, the ability to support such functionality on mobile devices such as those described herein is of importance, as mobile electronic commerce is fast becoming an important facet of today's online environment. In providing functionality such as that described herein, network architecture 200 is able to support the identification and presentation of relevant product/service information in an efficient, effective manner.

It will be appreciated that, in light of the present disclosure, the variable identifier "N" is used in several instances in various of the figures herein to more simply designate the final element of a series of related or similar elements (e.g., intranets 220(1)-(N), clients 225(1)-(N), and servers 230(1)- (N)). The repeated use of such variable identifiers is not meant to imply a correlation between the sizes of such series of elements. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

As will be appreciated in light of the present disclosure, processes according to concepts embodied by systems such as those described herein include one or more operations, which may be performed in any appropriate order. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable storage media. In one embodiment, such modules or portions of modules can be configured to host one or more components of FIG. 1 and to perform one or more of the functions associated with FIGS. 7-9, such as when one or more of such components are hosted in the cloud or as a cloud-based service(s).

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with this disclosure.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system such as computer system 310. Thus, the above described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module, for example.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable storage media. The computer readable storage media may be permanently, removably or remotely coupled to the computer system. The computer readable storage media may non-exclusively include, for example, any number of the following: magnetic storage media including disk and tape storage media, optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits; volatile storage media including registers, buffers or caches, main memory, RAM, and the like; and other such computer-readable storage media. In a UNIX-based embodiment, the software modules may be embodied in a file, which may be a device, a terminal, a local or remote file, or other such devices. Other new and various types of computer-readable storage media may be used to store the software modules discussed herein.

Example Architectures for Characterization of Products and/or Services

Figure 3:
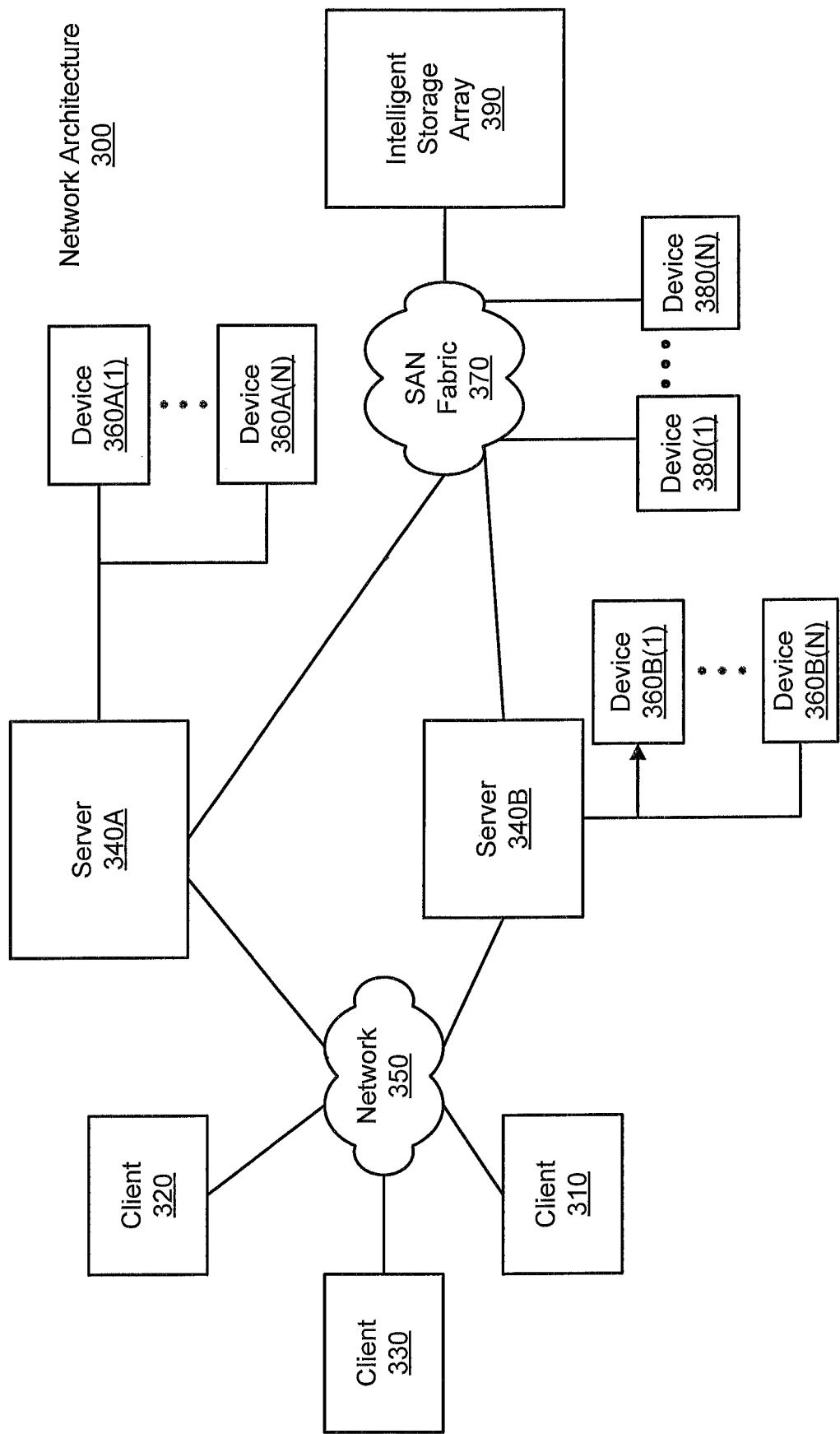
FIG. 3 is a block diagram depicting a network architecture suitable for implementing aspects of systems according to embodiments of systems and methods such as those disclosed herein.

FIG. 3 is a block diagram depicting a network architecture 300 in which client systems 310, 320 and 330, as well as storage servers 340A and 340B (any of which can be implemented using computer system 310), are coupled to a network 350. Storage server 340A is further depicted as having storage devices 360A(1)-(N) directly attached, and storage server 340B is depicted with storage devices 360B(1)-(N) directly attached. Storage servers 340A and 340B are also connected to a SAN fabric 370, although connection to a storage area network is not required for operation. SAN fabric 370 supports access to storage devices 380(1)-(N) by storage servers 340A and 340B, and so by client systems 310, 320 and 330 via network 350. Intelligent storage array 390 is also shown as an example of a specific storage device accessible via SAN fabric 370.

Figure 7:
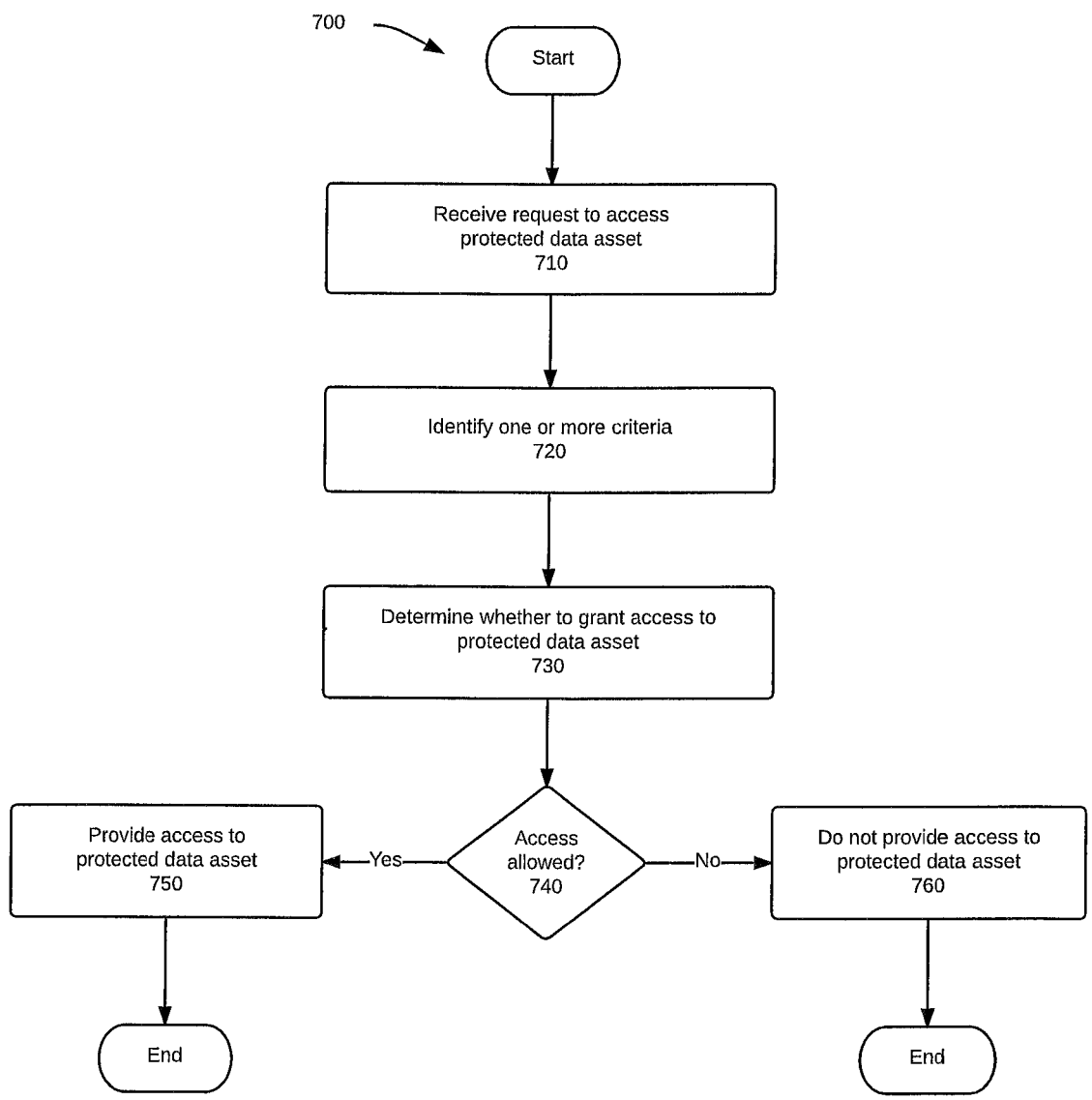
FIG. 7 is a flowchart that illustrates actions that can be performed by a secure agent to grant access to a protected data asset, according to one embodiment.
Figure 8:
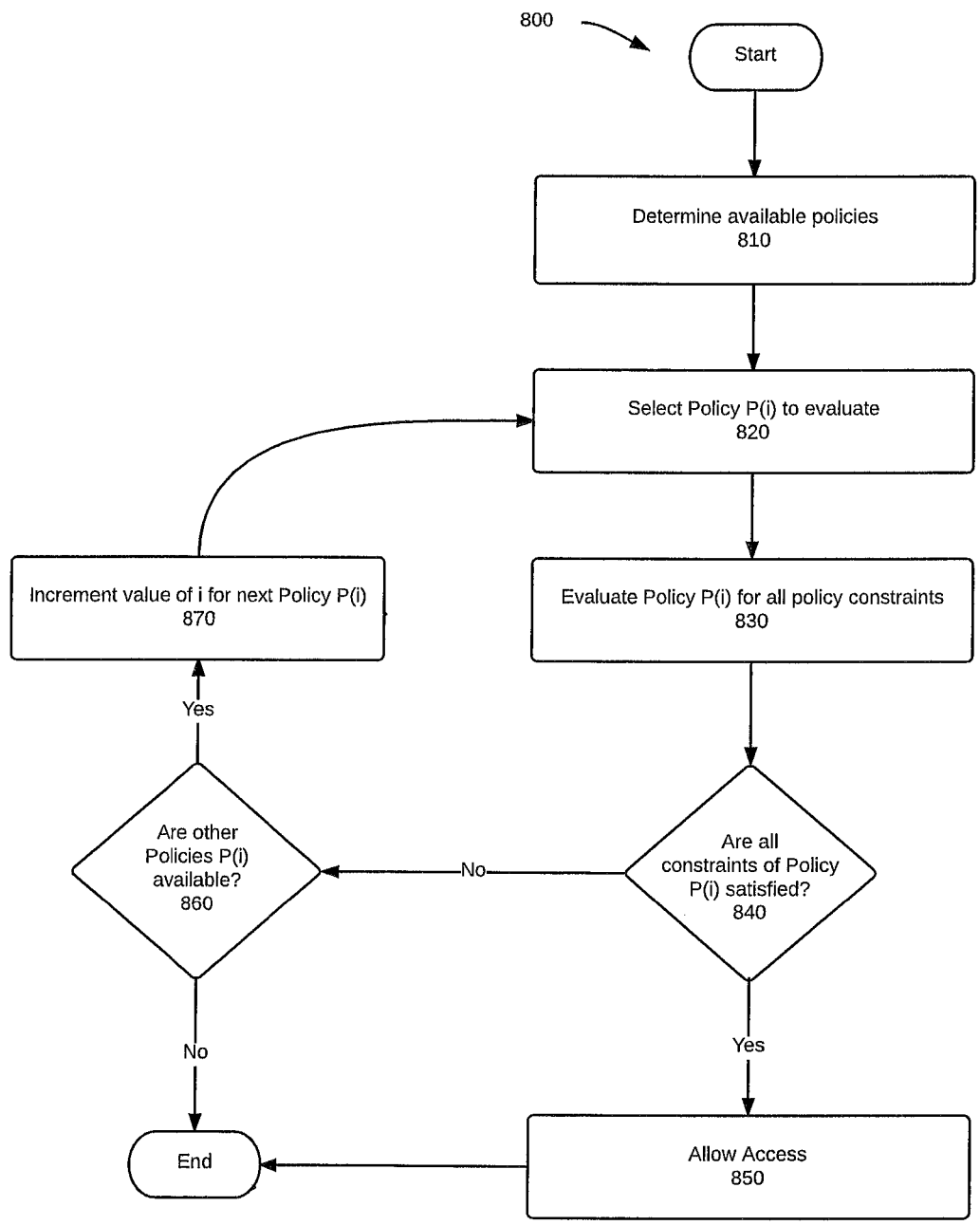
FIG. 8 is a simplified flow diagram depicting a process for evaluating one or more policies, according to one embodiment.

With reference to computer system 610, described below, modem 647, network interface 648 or some other method can be used to provide connectivity from each of client computer systems 310, 320 and 330 to network 350. Client systems 310, 320 and 330 are able to access information on storage server 340A or 340B using, for example, a web browser or other client software (not shown). Such a client allows client systems 310, 320 and 330 to access data hosted by storage server 340A or 340B or one of storage devices 360A(1)-(N), 360B(1)-(N), 380(1)-(N) or intelligent storage array 390. FIGS. 7 and 8 depict the use of a network such as the Internet for exchanging data, but the systems described herein are not limited to the Internet or any particular network-based environment.

The foregoing described embodiments wherein the different components are contained within different other components (e.g., the various elements shown as components of computer system 610, discussed subsequently). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Example Networking Devices

Figure 4:
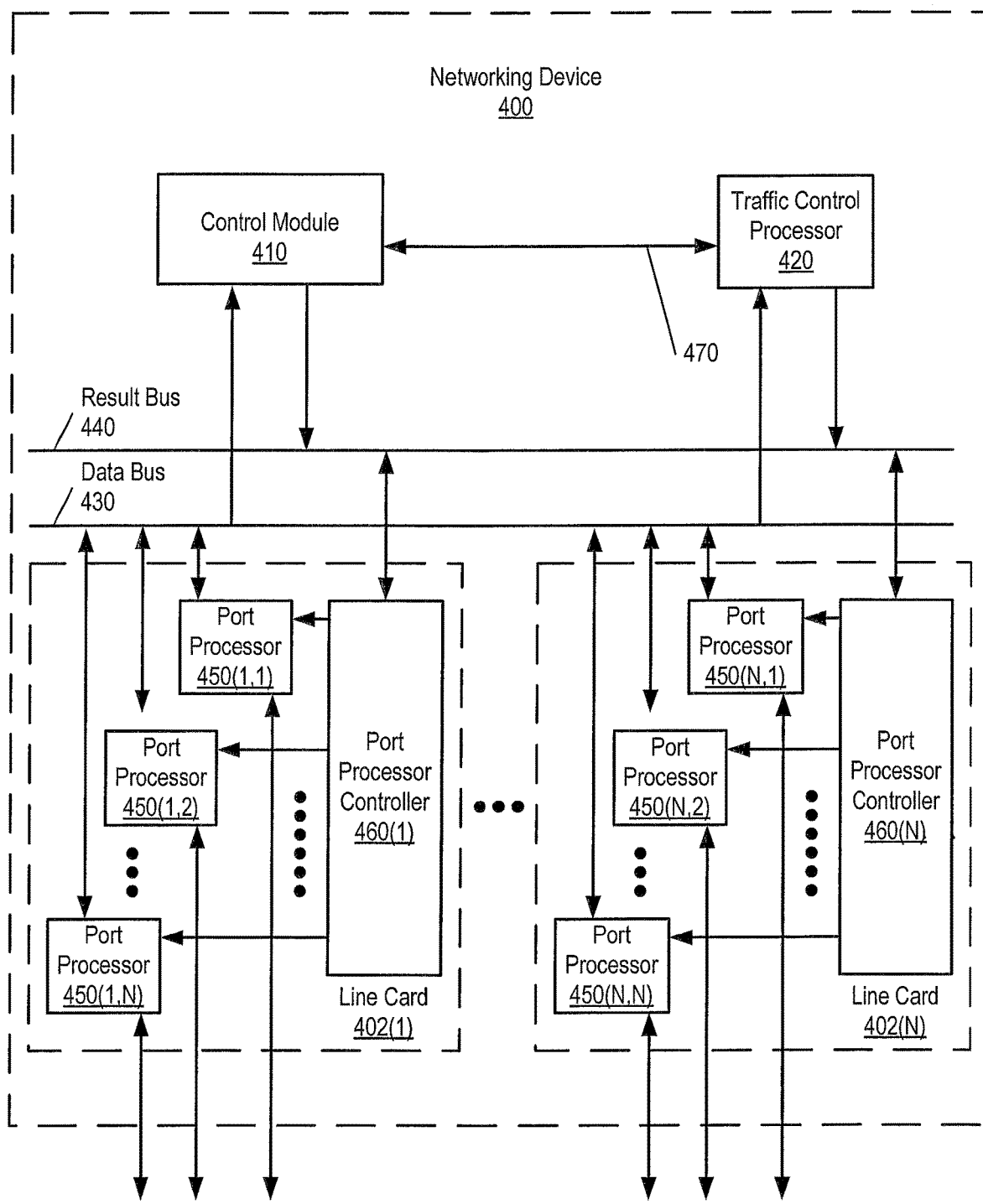
FIG. 4 is a block diagram illustrating components of an example networking device in which the present disclosure can be implemented, according to one embodiment.

FIG. 4 is a block diagram illustrating components of an example networking device 400, which depicts (at least in part) one configuration of a network device or a network routing element (e.g., a hub, router, switch, or similar device). In this depiction, networking device 400 includes a number of line cards (line cards 402(1)-402(N)) that are communicatively coupled to a control module 410 (which can include a forwarding engine, not shown) and a traffic control (or flow control) processor 420 via a data bus 430 and a result bus 440. Line cards 402(1)-(N) include a number of port processors 450(1,1)-450(N,N) which are controlled by port processor controllers 460(1)-460(N). It will also be noted that control module 410 and route processor 420 are not only coupled to one another via data bus 430 and result bus 440, but are also communicatively coupled to one another by a communications link 470. It is noted that in alternative embodiments, each line card can include its own forwarding engine.

When a message (e.g., an authorization request, a commissioning certificate, or a commissioning complete confirmation message) is received by a network device or network routing element such as networking device 400, the message is identified and analyzed in the following manner Upon receipt, a message (or some or all of its control information) is sent from one of the port processors 450(1,1)-450(N,N) at which the message was received to one or more of those devices coupled to data bus 430 (e.g., others of port processors 450(1,1)-450(N,N), a forwarding engine, and/or route processor 420). Handling of the message can be performance, for example, by a forwarding engine in accordance with the systems and methods disclosed herein. For example, a forwarding engine may determine that the message should be forwarded to one or more of port processors 450(1,1)-450(N,N). This can be accomplished by indicating to a corresponding one(s) of port processor controllers 460(1)-460(N) that the copy of the message held in the given one(s) of port processors 450(1,1)-450(N,N) should be forwarded to the appropriate one of port processors 450(1,1)-450(N,N).

Networking device 400 can be used, for example, in the implementation of a network device (e.g., policy service 110, data access control server 120, user device 130, user interface 140, data analytics and reporting service 150, encryption server 160, and location tracking server 170, among other examples) or a network routing element in control module 410, or in one or more of port processor controllers 460(1)-460(N) and/or in route processor 420, in order to implement the present disclosure. Although not shown, network device 400 can also be used to implement a routing protocol module and/or network reachability protocol module in control module 410, in one of port processor controllers 460(1)-460(N), and/or in route processor 420 (not shown). Moreover, control module 410 can implement one or more steps of method 700 or method 800, and can be used in conjunction with (or as part of) police service 110, data access control server 120, user device 130, user interface 140, data analytics and reporting system 150, encryption server 160, location tracking server 170, and/or of the subcomponents or inputs (such as, e.g., policy information inputs 118) of any of those components of system 100.

An incoming message (e.g., an authorization request, a commissioning certificate, or a commissioning complete confirmation message) can be provided to a network device or network routing element via a forwarding engine or port processor of a line card coupled to a port that received the incoming message. Network device 400 can be configured to process the incoming message and to generate one or more outgoing messages (e.g., an authorization request, a commissioning certificate, or a commissioning complete confirmation message), as described throughout this disclosure.

The outgoing message can be provided to a forwarding engine by a network device or a network routing device, which can determine that the outgoing message should be forwarded to one or more of port processors 450(1,1)-450(N,N) that are configured to transmit the outgoing message toward the outgoing message's destination.

Figure 5:
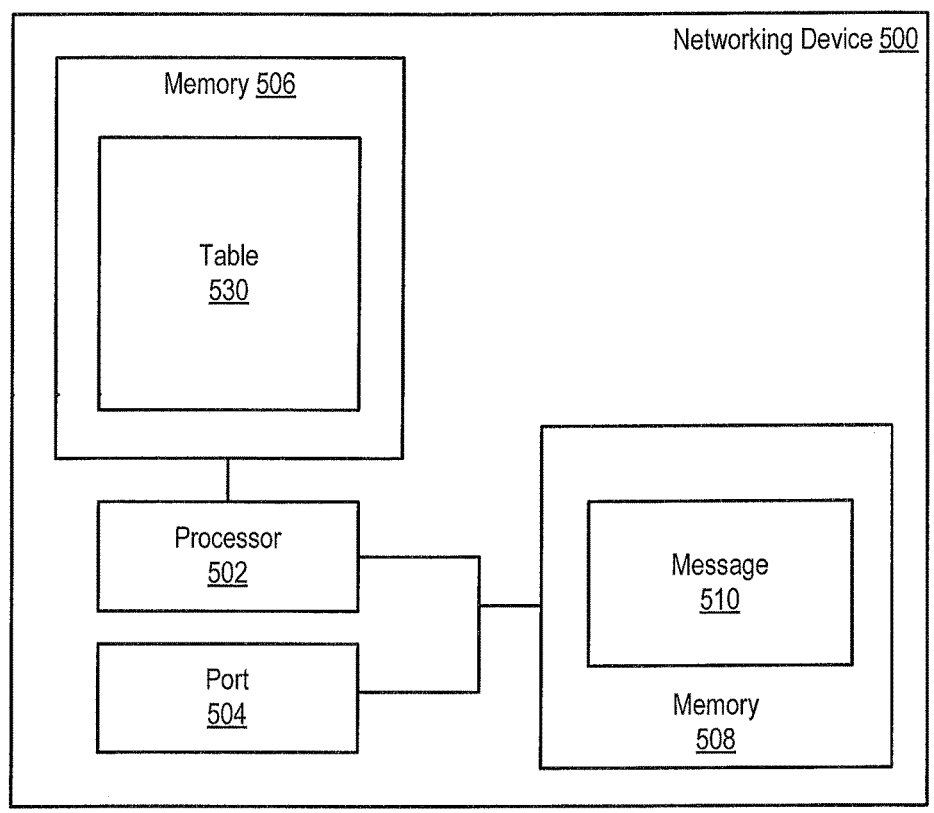
FIG. 5 is a block diagram illustrating components of an example networking device in which the present disclosure can be implemented, according to one embodiment.

FIG. 5 is a block diagram illustrating components of an example networking device 500, in which the networking device is configured as a network device (e.g., policy service 110, data access control server 120, and user device 130, among other examples) or a network routing element. As illustrated, networking device 500 includes one or more processors 502 (e.g., microprocessors, PLDs (Programmable Logic Devices), or ASICs (Application Specific Integrated Circuits)) configured to execute program instructions stored in memories 506 and/or 508, which are computer readable storage media. Memories 506 and 508 can include various types of RAM (Random Access Memory), ROM (Read Only Memory), Flash memory, MEMS (Micro Electro-Mechanical Systems) memory, and the like. Networking device 500 also includes one or more ports 504 (e.g., one or more hardware ports or other network interfaces that can be linked to other networking devices, hosts, servers, storage devices, or the like). Processor 502, port 504, and memories 506 and 508 are coupled to send and receive data and control signals by one or more buses or other interconnects.

In this example, program instructions executable to implement the systems and methods disclosed herein are stored in memory 506. Topology information and network reachability information can be stored in one or more tables 530.

Message 510 (e.g., an authorization request, a commissioning certificate, or a commissioning complete confirmation message) is stored in memory 508. In one embodiment, message 510 can be received from port 504 (e.g., received from another networking device coupled to port 504), and can be stored in memory 508 before being provided forwarded to another networking device in accordance with the systems and methods of this disclosure. In one embodiment, outgoing message 510 can be generated and stored in memory 508 before being transmitted via port 504.

Example Computing and Network Environment

As shown above, the present disclosure can be implemented using a variety of computer systems and networks. An example of one such computing environment is described below with reference to FIG. 6.

Figure 6:
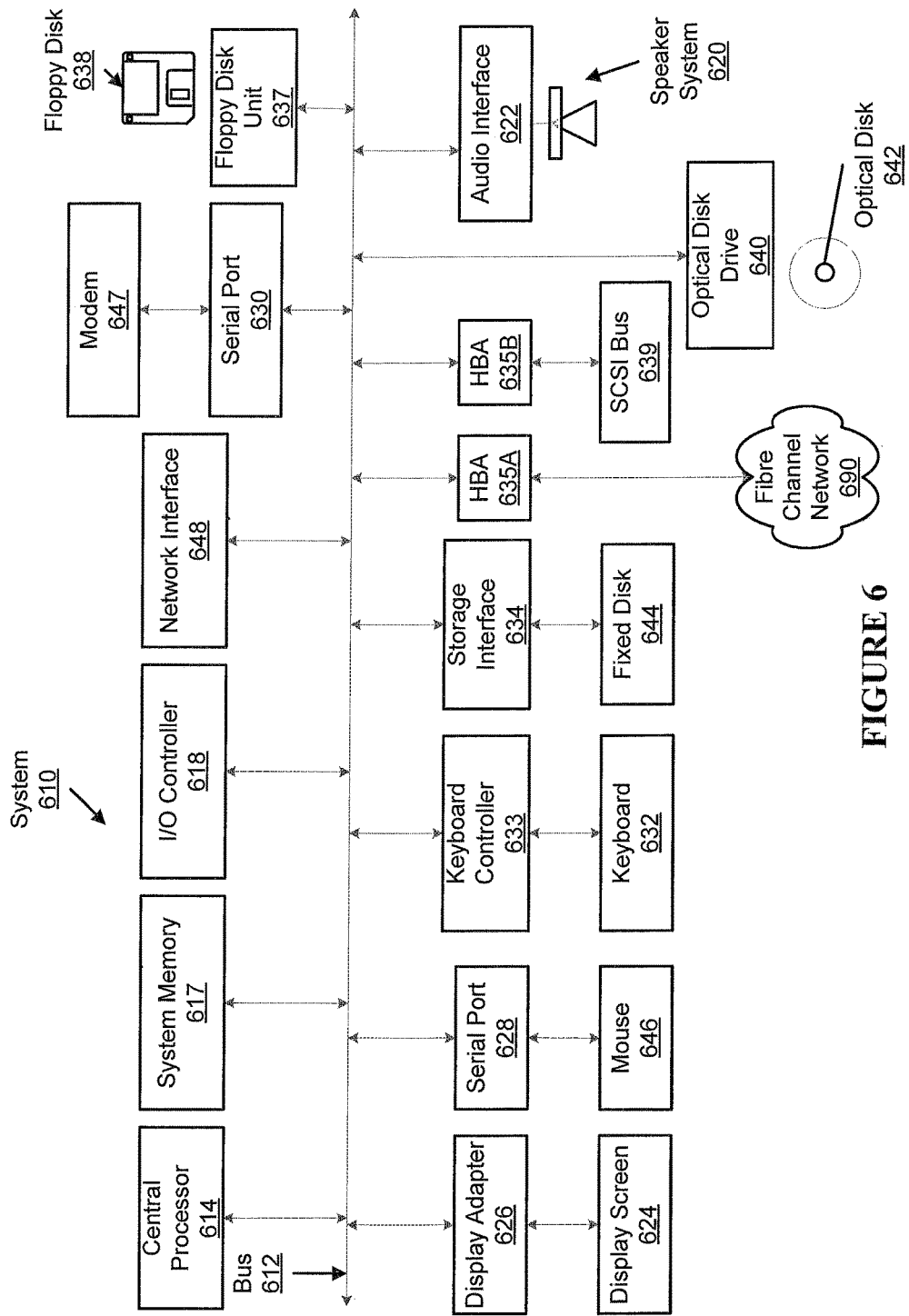
FIG. 6 is a simplified block diagram of a network architecture suitable for implementing aspects of the present disclosure, according to one embodiment.

FIG. 6 depicts a block diagram of a computer system 610 suitable for implementing aspects of the present disclosure.

Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident within (or otherwise added to or stored in) computer system 610 are generally stored on and accessed via a computer-readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer-readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present disclosure. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Example Method for Determining Whether to Grant Access to a Protected Data Asset FIG. 7 is a flowchart of method 700 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment.

Method 700, which is described with reference to the example elements shown in FIGS. 1-6, shows a procedure that can be performed in accordance with this disclosure. More specifically, method 700 depicts a method for granting access, when appropriate, to a protected data asset. In one embodiment, method 700 can be performed by a secure agent, such as secure agent 136.

Method 700 begins at step 710, where a secure agent (such as, e.g., secure agent 136) receives a request for access to a protected data asset. In response to receiving that request, secure agent identifies in step 720 one or more criteria that are to be evaluated by a policy (or policies) associated with the protected data asset. Although the specific criteria can vary by implementation, examples of some potential criteria are discussed throughout this disclosure (e.g., UserName, password, device type, DeviceID, UUID, physical location, network, current time, and so forth). In step 730, method 700 then uses the relevant criteria for that policy to determine whether to grant access to the protected data asset for which access has been requested. Specific examples of steps 720 and 730 are discussed in more detail throughout this disclosure, including both above as well as in the following paragraphs. In one embodiment, this determination can be made by secure agent 136, either acting alone or acting in conjunction with other components of this system, such as policy store 110, data access control server 120, and encryption server 160. In other embodiments, this determination can be made by one or more of the other components of system 100, with the result of the determination then being relayed to secure agent 136 for evaluation and further processing.

In step 740, secure agent 136 then evaluates the result of the determination to determine whether access to the protected data asset should be allowed (or granted). If method 700 determines in step 740 that access should be allowed (or granted), then secure agent 136 can perform other steps in step 750 to provide access to the protected digital data asset. Examples of such steps are provided elsewhere in this disclosure, some of which are repeated herein for ease of discussion, such as, e.g., obtaining the relevant decryption materials and using those decryption materials to decrypt the protected data asset, thereby allowing an underlying software application (e.g., MICROSOFT® WORD®) to access, open, and/or display the data asset on the user device. If method 700 determines in step 740 that access should not be allowed (or not granted), then method 700 moves to step 760 and does not allow (or grant) access (or take any steps towards granting access, such as obtaining the decryption materials) to the protected data asset, in which case the protected data asset will remain encrypted and the user's device will not be able to open, display, or otherwise access that protected data asset. Following either step 750 or step 760, method 700 ends.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Example Operation of Location Functionality

As alluded to above, dynamic location tracking (as one example of dynamic attribute tracking) is an important attribute for policy creation, enforcement, and maintenance, with respect to the system and methods described in this disclosure. To further facilitate such dynamic location tracking, location tracking functionality can also be provided by methods and systems such as those described herein. To that end, such dynamic location tracking functionality can be used in conjunction with at least the steps of method 700, as described herein. When combined with other document classification attributes, such as those described herein, location tracking enables the system and methods disclosed herein to control access to a protected data asset based on the location or locations where the document may be, or may not be, accessed.

As one example, a user (e.g., with a username of "Bob") can log in to a system via a device (e.g., his laptop, with a device name of "laptop"). In accordance with this example, the system can recognize the user device by a name such as "Bob+laptop," thereby indicating both the user and the device being used. The system can then use location tracking functionality, such as is provided by CMX, to track the location of Bob+laptop. When a login is performed by the user device "Bob+laptop," a location event is generated. Similarly, when Bob+laptop changes locations (e.g., physically, logically (such as, e.g., by disconnecting from one network and then connecting to another network), or the like), another location event is generated. Location events such as these are consumed by the system and a location tracker is initiated for "Bob+laptop" (Bob accessing the system using his laptop). In certain embodiments, location events can be consumed either by a push model or a pull model, or some combination thereof.

A location tracker according to the methods and systems described herein can be implemented in a software module, a hardware module, or some combination thereof. In certain embodiments, when implemented as a software module, for example, a location tracker is initiated for a user-device combination, such as for "Bob+laptop." Such a location tracker can store client information (e.g., information regarding the user, the device, the user device, and/or other pertinent information), a current location of the user device, and information about the validity of such information. When the user (e.g., "Bob") attempts to open a protected data asset using a device (e.g., "laptop"), the respective policy is evaluated against information maintained by the tracker. If "Bob+laptop" is in a location that is approved by the policy, such as, e.g., Bob's office, the system can provide the information (e.g., the decryption materials) needed to access (e.g., decrypt) the protected data asset. When "Bob+laptop" moves, however, a new location event may be generated. Assuming such a change in location is sufficient to produce such a location event (e.g., based on the type of movement, the technologies involved and their granularity, the policy's constraints, and other such factors), if "Bob+laptop" then tries to access a protected data asset (e.g., to open a file) from the new location (or attempts to maintain access to the data asset in question), the new location can be verified, and access granted or denied (or revoked) based on that new location. If the new location is not an acceptable location based on the applicable policy/policies (e.g., referred to herein as being an "invalid" location), then "Bob+laptop" will not be granted access to (e.g., the system will not provide the necessary decryption materials to decrypt) the protected data asset that "Bob+laptop" is attempting to open (or will revoke access to the protected data asset (e.g., by forcing closure of the file and flushing the associated decryption materials from the secure agent's computer-readable storage media (e.g., memory))).

In one aspect of methods and systems such as those described herein, information related to a location event can be stored in a non-transitory computer-readable storage medium, such as a database or log file stored on a hard disk drive. In one embodiment, each location event can be indexed by a "DeviceId" or similar value, such as a network address (e.g., a media access control (MAC) layer address). In another embodiment, each location event can be indexed by a different value, such as a combination of a UserName and a DeviceId. Regardless of the specify key used to uniquely identify the record, the computer-readable storage medium (e.g., database stored therein) can also store other information such as a unique policy identification value (e.g., a universally unique identifier (UUID) for a given instance of the policy), a client UUID (e.g., a unique value to represent the client or user), the current location (e.g., as provided by the respective location event), information regarding one or more policy location constraints (e.g., physical locations where the policy permits, or does not permit, access to the protected data asset), and a "location valid" flag (e.g., a BOOLEAN value) indicating whether the current location is valid (e.g., indicating that a location is acceptable in terms of the applicable policy/policies (as opposed to the "invalid location" discussed earlier)), among other information that can be stored in a database or other memory structure.

In one embodiment, client location tracking begins with the first policy having a location constraint applicable to the given client, and ends with the last policy having a location constraint applicable thereto. Client location tracking can be configured to avoid unnecessary tracking operations and processing of location update events. For instance, the system can be designed to avoiding the creation of location update events unless the device moves at least a certain amount (e.g., distance) and/or changes access points (e.g., cell, wireless access point (WAP), and/or the like, and/or combination thereof), thereby avoiding repeated location updates every time a user device's "location" changes, or in the face of similar occurrences. In other embodiments, location update events can be generated automatically (e.g., at set time intervals), thereby also avoiding repeated location update events upon repeated minor changes in the user device's location. As will be described in more detail below, location update events can be based on either a push model (which can be based, for example, on one or more applicable time period(s) and/or physical movement, among other potential criteria) or a pull model (e.g., based on one or more applicable time period(s), although other criteria are also possible).

In one embodiment, client location update events are received by policy store 110 in conjunction with event store 116 (and/or by one or more other components of system 100) and, in certain embodiments, in conjunction with one or more components of user interface 140, and are processed as follows: The system, or the relevant system component(s), retrieve(s) or "select(s)" the relevant policy instances based on the given key value, such as the combination of DeviceId and Client UUID, for the relevant policy index. Upon retrieving or selecting the relevant policy instances, the system can iterate over the retrieved/selected policy instances, update the current location of the user device with respect to each of those policy instances, compare the current location to the location constraint provided by the policy to determine whether access to the protected data asset(s) should still be allowed under each respective policy, and/or update the location valid flag value in the corresponding policy instance if the location validation has changed, therefore avoiding unnecessary updates to a record for the user device with respect to each affected policy instance if the location valid flag value (e.g., TRUE/FALSE) has not changed. The system can use a process such as this to efficiently locate and, if needed, to update affected client policy instances (e.g., all those that could be affected by location change).

As indicated above, policy instances in certain embodiments are updated using one or a combination of two primary methods: a pull method (e.g., by way of a technique such as polling) and a push method (e.g., by way of a technique such as a call back from a push notification). Similarly, the system can be set to operate in either a pull mode, and/or a push mode. When operating in pull mode, each relevant policy instance is validated, for example, by the system (e.g., policy service 110) polling each user device or other client/endpoint at set time intervals, in order to obtain the current location of the device and determine whether the location is still valid with respect to each policy.

In push mode, user device 130 has primary responsibility for updating system 100 (e.g., policy service 110 and/or data access control server 120) when a location update event occurs. As alluded to above, location update events can be pushed from user device 130 to other components of system 100 based on either time, movement of user device 130, or a combination of the two, among other such possible events.

When operating based on time, user device 130 (or a component of user device 130, such as secure agent 126) can be configured to push a location update event at certain time intervals, such as, e.g., every 5 minutes, or once per day. The length and frequency of such time intervals can be configured by an administrator (such as by using user interface 140) based, at least in part, upon the sensitivity of the digital data assets covered by the specific policy instance. When operating based on location, user device 130 (or a component of user device 130, such as secure agent 126) can be configured to push a location update event based on various location-based criteria, such as when user device 130 has moved a certain physical distance (e.g., at least 10 feet), when user device 130 crosses a physical or network boundary (e.g., leaving a room, or switching to a different network or router within a network), when user device 130 moves from one network connection to another, and/or the like.

Regardless of how a location update event occurred, the system can process the event upon receipt (such as, e.g., upon receipt at policy service 110). For instance, the system (e.g., policy service 110) can log each received event in event store 116 and update the policy instances in policy store 114, such as by the method steps described above. Moreover, if the system (e.g., policy service 110) determines that the location is no longer valid, the system (e.g., policy service 110) can send a notification to data access control server 120 and/or user device 130 indicating that access to the respective data asset(s) should be revoke (if previously granted), or that such access should not be provided if requested for any currently-protected digital data assets. In the situation where access that was previously granted is being revoked, the system can issue a command requiring secure agent 136 to close and/or re-encrypt the respective data asset(s).

Method 800, which is described with reference to the example elements shown in FIGS. 1-6, shows a process that can be performed in accordance with this disclosure. More specifically, method 800 depicts a process for evaluating one or more policies, according to one embodiment. In one embodiment, one or more steps of method 800 can be performed by a user device, such as policy service 110 and/or data access control server 120, working in conjunction with each other and with other elements such as those depicted in FIGS. 1-6.

In the example method of FIG. 8, the determination of policy enforcement begins in step 810 by determining what policy or policies are applicable to a given client policy session. Assuming at least one policy is applicable to the current client policy session, method 800 then selects a policy P(i) to evaluate in step 820. (As used in the context of FIG. 8 and this accompanying discussing, and as would be understood in the art, "i" is an integer used to track the current policy that is being evaluated.)

After selecting a policy P(i) in step 820, method 800 then evaluates that policy in step 830 by evaluating each of the policy constraints, including any constraints that may be implicit in that policy, against various information and inputs, such as those described elsewhere in this disclosure. In step 840, method 800 makes a determination based upon the outcome of the evaluation in step 830. If step 840 determines that all the constraints of that policy were satisfied, method 800 then proceeds to step 850, at which point method 800 allows access to the protected data asset at issue (or granting standing access to a user device), and method 800 then ends.

If step 840 determines that all the constraints of that policy were not satisfied, method 800 then proceeds to step

860. In step 860, method 800 then determines if any other policies P(i) exist. If step 860 determines that at least one more policy is available, method 800 then proceeds to step 870. Method 800 then increments the counting variable ("i") in step 870, then returns to step 820 where the next policy P(i) is selected. (Although step 870 is included herein for ease of following the steps of the flowchart in FIG. 8, in practice no such counting variable is necessarily required, although such a counting variable may be used.) If step 860 determines that no other policies exist, method 800 then ends.

In the embodiment shown in FIG. 8 and described above, access to a protected data asset can be granted if the constraints of any one policy P(i) are fully satisfied. For instance, in the embodiment shown in FIG. 8, each policy may include a variety of constraints, such as, e.g., user group, location information, and time. In this embodiment, each policy can contain its own set of constraints, although the particular constraints and the acceptable values of those constraints may vary from policy to policy. As an example, a first policy can dictate that a certain protected data asset can be accessed by a member of an "executive" user group if the secure agent requesting access is located in a particular office and the request is being made at any time of the day. A second policy can dictate that the same protected data asset can be accessed by a member of an "administrative" user group if a member of the "executive" user group is within a certain distance and the request is being made from a conference room during normal business hours. In this example, if the constraints of any policy are fully satisfied, then access can be granted to the protected data asset.

Although not expressly depicted in FIG. 8, an alternative embodiment also exists. In this alternative embodiment, access is only granted if the constraints of every policy P(i) are fully satisfied. This embodiment allows for a situation where a separate policy exists for each constraint. For instance, a first "user group" policy may exist covering all of the "user groups" that have permission to access a protected data asset, a second "location" policy may exist covering all of the acceptable locations in which a protected data asset can be accessed, a third "time" policy may exist covering the acceptable times at which a protected data asset can be accessed, and so forth. Thus, in this alternative embodiment, the constraints in each policy may have a logical "OR" relationship with each other. For instance, the "location" policy may include constraints indicating that a protected data asset can be accessed in either an executive's office, an associate's office, or in a conference room. Since a secure agent generally cannot be in three different locations at the same time, this policy may include these constraints in a logical "OR" relationship, or as a series of alternative ways to satisfy the "location" policy. Thus, in this embodiment, access should only be granted if at least one constraint from each policy type (e.g., user group policy, location policy, time policy, and so forth) is satisfied.

Thus, in this alternative embodiment, steps 810-840 remain the same. In this alternative embodiment, however, method 800 would proceed to step 860 if step 840 determines that all of the constraints of a given policy P(i) have been satisfied. If any other policies are available in step 860, method 800 then proceeds to step 870 and then loops back to 820. In this alternative embodiment, method 800 continues this loop as long as other policies are available and no policy fails in step 840. If method 800 iterates through all available policies P(i) without any of the policies failing in step 840, method 800 of this alternative embodiment then proceeds to step 850 where access is granted, at which point this alternative embodiment of method 800 ends. If step 840 determines, during any iteration through method 800, that all of the constraints of any given policy P(i) have not been satisfied, then this alternative embodiment would then end without granting access to the protected digital data asset (or granting standing access to a user device).

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Figure 9:
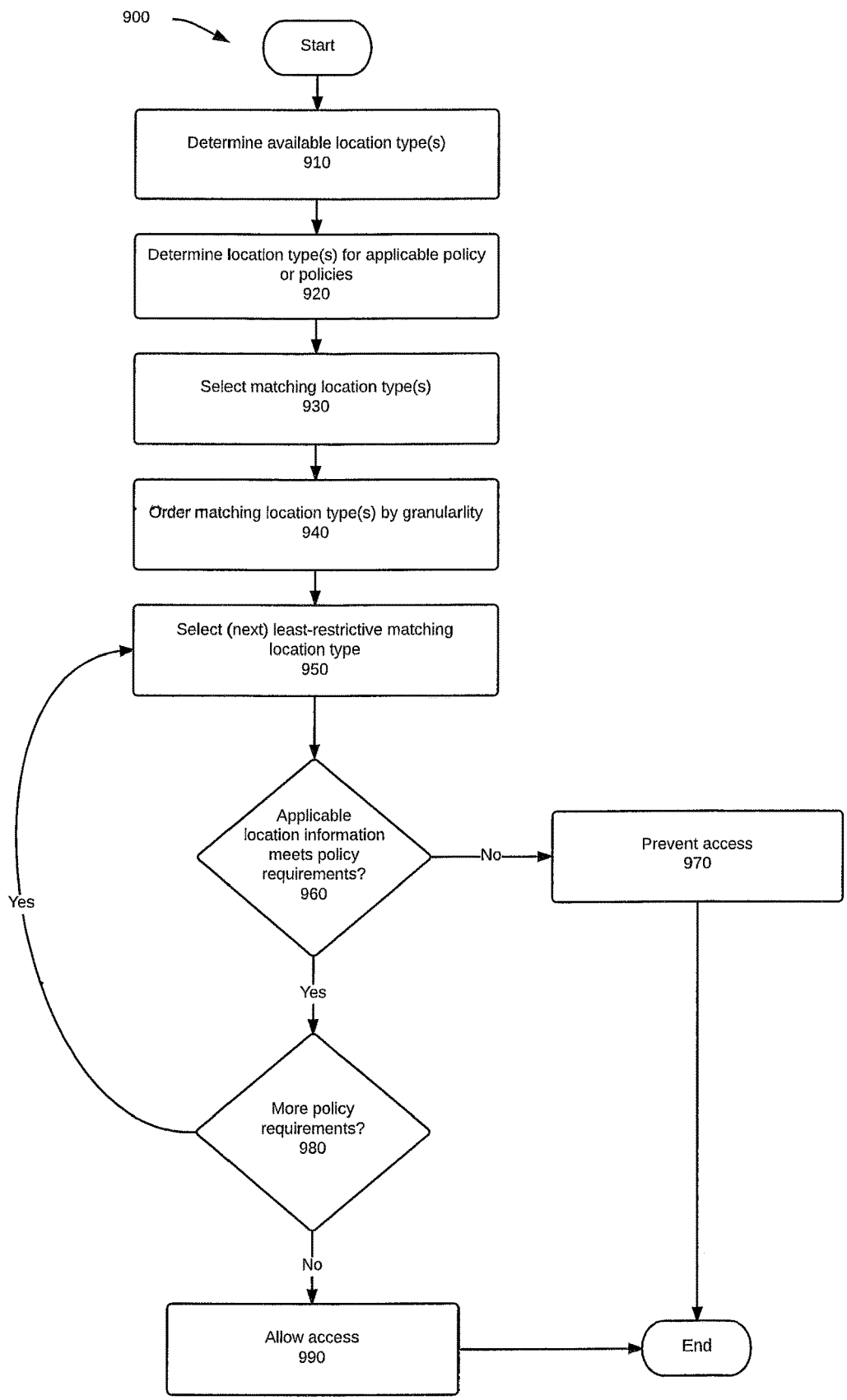
FIG. 9 is a simplified flow diagram depicting a process for determining a location with sufficient granularity, according to one embodiment.

FIG. 9 is a flowchart of method 900 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment.

Method 900, which is described with reference to the example elements shown in FIGS. 1-6, shows a process that can be performed in accordance with this disclosure. More specifically, method 900 depicts a process for determining a location with sufficient granularity, according to one embodiment. In one embodiment, one or more steps of method 900 can be performed by a user device, such as user device 130, and/or location tracking server 170, working in conjunction with each other and with other elements such as those depicted in FIGS. 1-6.

In the example process of FIG. 9, the determination of policy enforcement, the process begins with a determination as to the available type(s) of location information in step 910. A determination is then made as to location information type(s) for applicable policy/policies in step 920. Matching location information type(s) are then selected in step 930. This results in a set of location information types that will be considered in policy application. Matching location information type(s) can then be ordered, or weighted, by their granularity in step 940. For example, less restrictive location information (e.g., GPS information) might be considered (ordered) before, or weighted more or less highly than, more restrictive location information (e.g., hyperlocation information). Moving on to step 950, the next least-restrictive matching location information type is selected for consideration and/or analysis. The applicable location information policy/policies requirement(s) are then applied and a determination made as to whether the policy/policies criteria are met in step 960. If the criteria in question are not met, an indication is made as to preventing the requested access in step 970. The process then concludes. Otherwise, the process iterates until the requisite policy requirements have been addressed. This iteration is accomplished by making a determination as to whether more policy requirements are to be considered and/or analyzed in step 980. If additional policy requirements are to be considered and/or analyzed, method 900 then loops back to step 950. Otherwise, if no more policy requirements are to be considered or analyzed, and if the applicable requirements have otherwise been met, then access to the protected data asset is granted in step 990. Method 900 then concludes.

As will be appreciated in light of the present disclosure, a policy such as that described herein can inform a decision about the location in which a given user/device should be with varying levels of granularity. For instance, a less exact requirement implies "looser" location control and faster authorization, and would generally consume less processing power and require less communications, thereby consuming less bandwidth and less computer resources than more exact requirements. Conversely, more exact location information implies more strict or precise location control, which reduces the risk of unauthorized access, but may take longer to authorize and may consume more bandwidth and more computing resources in the process. Moreover, the finer the granularity, the more sensitive the system is to location changes, but the more location information is generated. The system disclosed herein provides for policies that can specify the granularity requirements of such location information based on predetermined parameters and/or other variables, and which can also specify the granularity requirements on a sliding scale or as a weighted value that is analyzed in conjunction with other values and/or information specified in the policy.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Other Embodiments

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   receiving a request to access a protected data asset, wherein
      the request is received from a first user device, and
      a member of a first user group has logged into the first user device;
   determining whether to grant access to the protected data asset, wherein
      the determining comprises
         evaluating first location information describing a first location associated with the first user device and first user group information describing the first user group,
         evaluating confirmation location information describing a confirmation location associated with a second user device associated with the member of the first user group, and
         evaluating second location information describing a second location associated with a third user device and second user group information describing a second user group associated with the third user device, wherein
    a member of a second user group has logged into the third user device, and
    the second user group has a different permission level than the first user group, and
  in response to evaluating the first location information, the first user group information, the second location information, the second user group information, and the confirmation location information, determining whether the member of the first user group has permission to access the protected data asset from the first location;
in response to a determination that the member of the first user group has permission to access the protected data asset from the first location, granting access to the protected data asset;
subsequent to the granting the access, receiving updated location information describing a new location, wherein
    the new location is associated with at least one of the first user device and the second user device; and
in response to receiving the updated location information, revoking access to the protected data asset, wherein
    the access is revoked in response to determining that the member of the first user group does not have permission to access the protected data asset from the new location.

2. The method of claim 1, wherein
the first location information indicates a geographic location of the first user device, and
the confirmation location information indicates a geographic location of the third user device.

3. The method of claim 2, wherein
a plurality of user groups comprises the first user group and the second user group,
the first user group is associated with a first plurality of locations,
the second user group is associated with a second plurality of locations, and
the first plurality of locations is not identical to the second plurality of locations.

4. The method of claim 1, wherein
the protected data asset is encrypted, and
the granting access comprises providing decryption information for the protected data asset.

5. The method of claim 1, wherein
the access to the protected data asset is granted to the first user device but access to the protected data asset is denied to at least a fourth user device.

6. The method of claim 1, wherein
the access is limited to a predetermined time period.

7. The method of claim 1, further comprising:
subsequent to the granting access,
    receiving the updated location information from at least one of the first user device, the second user device, or the third user device, and
    using the updated location information to determine whether to revoke access to the protected data asset.

8. A system comprising:
a microprocessor; and
a non-transient computer-readable storage medium, comprising computer instructions executable by the microprocessor, wherein the computer instructions are configured to perform a method comprising the steps of:
  receiving a request to access a protected data asset, wherein
    the request is received from a first user device, and
    a member of a first user group has logged into the first user device;
  determining whether to grant access to the protected data asset, wherein
    the determining comprises
      evaluating first location information describing a first location associated with the first user device and first user group information describing the first user group,
      evaluating confirmation location information describing a confirmation location associated with a second user device associated with the member of the first user group, and
      evaluating second location information describing a second location associated with a third user device and second user group information describing a second user group associated with the third user device, wherein
        a member of a second user group has logged into the third user device, and
        the second user group has a different permission level than the first user group, and
    in response to evaluating the first location information, the first user group information, the second location information, the second user group information, and the confirmation location information, determining whether the member of the first user group has permission to access the protected data asset from the first location;
  in response to a determination that the member of the first user group has permission to access the protected data asset from the first location, granting access to the protected data asset;
  subsequent to the granting the access, receiving updated location information describing a new location, wherein
    the new location is associated with at least one of the first user device and the second user device; and
  in response to receiving the updated location information, revoking access to the protected data asset, wherein
    the access is revoked in response to determining that the member of the first user group does not have permission to access the protected data asset from the new location.

9. The system of claim 8, wherein
the first location information indicates a geographic location of the first user device, and
the confirmation location information indicates a geographic location of the third user device.

10. The system of claim 9, wherein
a plurality of user groups comprises the first user group and the second user group,
the first user group is associated with a first plurality of locations,
the second user group is associated with a second plurality of locations, and
the first plurality of locations is not identical to the second plurality of locations.

11. The system of claim 8, wherein
the protected data asset is encrypted, and
the granting access comprises providing decryption information for the protected data asset.

12. The system of claim 8, wherein
the access to the protected data asset is granted to the first user device but access to the protected data asset is denied to at least a fourth user device.

13. The system of claim 8, wherein
the access is limited to a predetermined time period.

14. The system of claim 8, wherein the method further comprises the steps of:
subsequent to the granting access,
receiving the updated location information from at least one of the first user device, the second user device, or the third user device, and
using the updated location information to determine whether to revoke access to the protected data asset.

15. A computer program product, comprising a plurality of instructions stored on a non-transient computer-readable storage medium, wherein the instructions are configured to execute a method comprising the steps of:
receiving a request to access a protected data asset, wherein
the request is received from a first user device, and
a member of a first user group has logged into the first user device;
determining whether to grant access to the protected data asset, wherein
the determining comprises
evaluating first location information describing a first location associated with the first user device and first user group information describing the first user group,
evaluating confirmation location information describing a confirmation location associated with a second user device associated with the member of the first user group, and
evaluating second location information describing a second location associated with a third user device and second user group information describing a second user group associated with the third user device, wherein
a member of a second user group has logged into the third user device, and
the second user group has a different permission level than the first user group, and
in response to evaluating the first location information, the first user group information, the second location information, the second user group information, and the confirmation location information, determining whether the member of the first user group has permission to access the protected data asset from the first location;
in response to a determination that the member of the first user group has permission to access the protected data asset from the first location, granting access to the protected data asset;
subsequent to the granting the access, receiving updated location information describing a new location, wherein
the new location is associated with at least one of the first user device and the second user device; and
in response to receiving the updated location information, revoking access to the protected data asset, wherein
the access is revoked in response to determining that the member of the first user group does not have permission to access the protected data asset from the new location.

16. The computer program product of claim 15, wherein
the first location information indicates a geographic location of the first user device, and
the confirmation location information indicates a geographic location of the third user device.

17. The computer program product of claim 16, wherein
a plurality of user groups comprises the first user group and the second user group, the first user group is associated with a first plurality of locations,
the second user group is associated with a second plurality of locations, and
the first plurality of locations is not identical to the second plurality of locations.

18. The computer program product of claim 15, wherein
the protected data asset is encrypted, and
the granting access comprises providing decryption information for the protected data asset.

19. The computer program product of claim 15, wherein
the access to the protected data asset is granted to the first user device but access to the protected data asset is denied to at least a fourth user device; and
the access is limited to a predetermined time period.

20. The computer program product of claim 15, wherein the method further comprises the steps of:
subsequent to the granting access,
receiving the updated location information from at least one of the first user device, the second user device, or the third user device, and
using the updated location information to determine whether to revoke access to the protected data asset.

* * * * *